United States Patent
Horn et al.

(10) Patent No.: US 11,343,514 B2
(45) Date of Patent: *May 24, 2022

(54) LOSSLESS COMPRESSION OF DIGITAL IMAGES USING PRIOR IMAGE CONTEXT

(71) Applicant: Dropbox, Inc., San Francisco, CA (US)

(72) Inventors: Daniel Horn, San Francisco, CA (US); Ken Elkabany, San Francisco, CA (US); Keith Winstein, Palo Alto, CA (US)

(73) Assignee: Dropbox, Inc., San Francisco, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/914,340

(22) Filed: Jun. 27, 2020

(65) Prior Publication Data

US 2020/0382797 A1    Dec. 3, 2020

Related U.S. Application Data

(63) Continuation of application No. 16/205,114, filed on Nov. 19, 2018, now Pat. No. 10,701,374, which is a
(Continued)

(51) Int. Cl.
*G06T 9/00* (2006.01)
*H04N 19/176* (2014.01)
(Continued)

(52) U.S. Cl.
CPC ......... *H04N 19/176* (2014.11); *H04N 19/124* (2014.11); *H04N 19/13* (2014.11);
(Continued)

(58) Field of Classification Search
CPC .... H04N 19/124; H04N 19/13; H04N 19/593; H04N 19/91; H04N 19/14; H04N 19/48; H04N 19/40; H04N 19/625; H04N 19/132; H04N 19/42; H04N 19/436; H04N 19/129; H04N 19/146; H04N 19/15; H04N 19/154; H04N 19/93; H04N 19/94; H04N 19/90; H04N 19/10–11; H04N 19/134; H04N 19/17–176; H04N 19/18–189; H04N 19/21; H04N 19/44; H04N 19/46–463; H04N 19/50–503; H04N 19/60–61;
(Continued)

(56) References Cited

U.S. PATENT DOCUMENTS

| 5,533,138 A | 7/1996 | Kim et al. |
| 5,596,376 A * | 1/1997 | Howe .................... H04N 9/642 348/716 |

(Continued)

FOREIGN PATENT DOCUMENTS

| AU | 2019261742 A1 | 11/2019 |
| WO | 03063359 A1 | 7/2003 |

OTHER PUBLICATIONS

Notice of Reasons for Refusal for Japanese Application No. 2020-114373, dated Sep. 3, 2021, 9 pages.
(Continued)

*Primary Examiner* — Jose L Couso
(74) *Attorney, Agent, or Firm* — Keller Preece PLLC

(57) ABSTRACT

Techniques for lossless compression of a digital image using prior image context.

20 Claims, 17 Drawing Sheets

Related U.S. Application Data continuation of application No. 15/822,401, filed on Nov. 27, 2017, now Pat. No. 10,171,820, which is a continuation of application No. 15/614,860, filed on Jun. 6, 2017, now Pat. No. 9,832,475, which is a continuation of application No. 15/281,604, filed on Sep. 30, 2016, now Pat. No. 9,712,830.

(60) Provisional application No. 62/395,269, filed on Sep. 15, 2016.

(51) Int. Cl.

| | | |
|---|---|---|
| *H04N 19/625* | (2014.01) | |
| *H04N 19/13* | (2014.01) | |
| *H04N 19/593* | (2014.01) | |
| *H04N 19/91* | (2014.01) | |
| *H04N 19/14* | (2014.01) | |
| *H04N 19/18* | (2014.01) | |
| *H04N 19/48* | (2014.01) | |
| *H04N 19/40* | (2014.01) | |
| *H04N 19/124* | (2014.01) | |
| *H04N 19/46* | (2014.01) | |
| *H04N 19/132* | (2014.01) | |
| *H04N 19/42* | (2014.01) | |
| *H04N 19/436* | (2014.01) | |

(52) U.S. Cl.
CPC ............ *H04N 19/14* (2014.11); *H04N 19/18* (2014.11); *H04N 19/40* (2014.11); *H04N 19/48* (2014.11); *H04N 19/593* (2014.11); *H04N 19/625* (2014.11); *H04N 19/91* (2014.11); *H04N 19/132* (2014.11); *H04N 19/42* (2014.11); *H04N 19/436* (2014.11); *H04N 19/46* (2014.11)

(58) Field of Classification Search
CPC ........... H04N 19/64–647; H04N 19/70; H04N 1/32267; H04N 1/415; H04N 11/02; H04N 11/042; H04N 5/783; H04N 5/9264; H03M 7/40; H03M 7/4006; H03M 7/42; H03M 7/425; H03M 7/46; H03M 7/30; H03M 7/4075; H03M 7/607; H03M 7/6076; G06F 17/147; G06T 9/007; G06T 9/008; G06T 9/005; G06T 9/00; G06T 9/40; G06T 7/168; G06T 7/30; G06T 7/37; G06T 7/42; G06T 3/4092; G06T 2207/20052; G06T 2207/20048; G06K 9/36
See application file for complete search history.

(56) References Cited

U.S. PATENT DOCUMENTS

| | | | | |
|---|---|---|---|---|
| 6,148,109 A * | 11/2000 | Boon | .................... | H04N 19/105 |
| | | | | 382/238 |
| 6,173,080 B1 | 1/2001 | Cho et al. | | |
| 6,414,608 B1 * | 7/2002 | Nishida | .................. | H04N 19/61 |
| | | | | 341/65 |
| 6,795,584 B2 | 9/2004 | Karczewicz et al. | | |
| 6,909,811 B1 * | 6/2005 | Kajiwara | ............... | H04N 19/46 |
| | | | | 375/E7.047 |
| 6,947,874 B2 | 9/2005 | Chen et al. | | |
| 7,365,659 B1 | 4/2008 | Hoffmann et al. | | |
| 7,978,923 B2 | 7/2011 | Yang et al. | | |
| 8,599,925 B2 | 12/2013 | Srinivasan et al. | | |
| 8,736,467 B2 | 5/2014 | Bossen et al. | | |
| 8,907,823 B2 * | 12/2014 | Marpe | .................... | H03M 7/42 |
| | | | | 341/107 |
| 8,934,541 B2 | 1/2015 | Cho et al. | | |
| 9,544,597 B1 | 1/2017 | Han et al. | | |
| 9,569,861 B2 | 2/2017 | Sato et al. | | |
| 9,674,541 B2 | 6/2017 | Cho et al. | | |
| 9,706,214 B2 | 7/2017 | Wu et al. | | |
| 9,712,830 B1 | 7/2017 | Horn et al. | | |
| 9,832,475 B1 | 11/2017 | Horn et al. | | |
| 2006/0233240 A1 | 10/2006 | Cha et al. | | |
| 2008/0144953 A1 | 6/2008 | Imafuku et al. | | |
| 2009/0273706 A1 * | 11/2009 | Tu | .......................... | H04N 19/46 |
| | | | | 348/420.1 |
| 2010/0046626 A1 * | 2/2010 | Tu | .......................... | H04N 19/61 |
| | | | | 375/240.18 |
| 2010/0135384 A1 * | 6/2010 | Berkvens | ............... | H04N 19/60 |
| | | | | 375/240.2 |
| 2012/0201476 A1 | 8/2012 | Carmel et al. | | |
| 2013/0301704 A1 * | 11/2013 | Srinivasan | .......... | H04N 19/122 |
| | | | | 375/240.02 |
| 2015/0016551 A1 * | 1/2015 | Esenlik | ................ | H04N 19/463 |
| | | | | 375/240.29 |
| 2015/0103893 A1 | 4/2015 | Chen et al. | | |
| 2015/0256843 A1 | 9/2015 | Roskowski et al. | | |
| 2016/0007037 A1 * | 1/2016 | Zhao | ..................... | H04N 19/17 |
| | | | | 382/233 |
| 2016/0007046 A1 * | 1/2016 | Chou | .................. | H04N 19/149 |
| | | | | 375/240.02 |
| 2016/0373765 A1 | 12/2016 | Zhang et al. | | |
| 2017/0026664 A1 | 1/2017 | Korodi et al. | | |
| 2017/0041623 A1 | 2/2017 | Lin et al. | | |
| 2017/0063392 A1 | 3/2017 | Kalevo et al. | | |
| 2018/0242020 A1 | 8/2018 | Siddeq et al. | | |
| 2019/0289301 A1 * | 9/2019 | Lim | ..................... | H04N 19/105 |

OTHER PUBLICATIONS

Alakuijala J., et al., "Brotli Compressed Data Format draft-alakuijala-brotli-08," Network Working Group, Dec. 2015, pp. 1-121.
Alakuijala J., et al., "Brotli Compressed Data Format," Internet Engineering Task Force, Jul. 2016, 129 pages.
Bankoski J., et al., "VP8 Data Format and Decoding Guide," Google Inc, Independent Submission, mailed Nov. 2011, 305 pages.
Bzip2 and libbzip2, "What is bzip2?" http://www.bzip.org/, last accessed on Sep. 29, 2016, 1 page.
Communication Pursuant to Article 94(3) for EP Application No. 17177635.4 dated Mar. 12, 2020, 4 pages.
Deutsch P., "DEFLATE Compressed Data Format Specification Version 1.3," Network Working Group, May 1996, 15 pages.
Examination Report No. 1, for Australian Application No. 2019261742, dated Jun. 30, 2020, 4 pages.
"GitHub Facebook/zstd: Zstandard Fast Realtime Compression Algorithm," retrieved from https://github.com/facebook on Sep. 29, 2016, 4 pages.
"GitHub Gluonanon/gluon: Gluon (JPEG Compression Software) for Anonymous Submission," retrieved from https://github.com/gluonanon/gluonon Sep. 29, 2016, 1 page.
GitHub Kud, "JPEGrescan: losslessly shrink any JPEG file," https://github.com/kud/jpegrescan, last accessed on Sep. 29, 2016, 2 pages.
Google, "Official Blog," Official Google Blog: Picture this: A fresh approach to Photos, https://googleblog.blogspot.com/2015/05/picturethisfreshapproachtophotos, last accessed on Sep. 29, 2016, 6 pages.
Hamilton E., "JPEG File Interchange Format," Version 1.02, Sep. 1, 1992, 9 pages.
Horn D.R, "Lepton Image Compression: Saving 22% Losslessly from Images at 15MB/s," Jul. 14, 2016, retrieved from the Internet: https://blogs.dropbox.com/tech/2016/07/lepton-image-compression-saving-22-losslessly-from-images-at- . . . , 12 pages.
Huffman D, "A Method for the Construction of Minimum-Redundancy Codes," Proceedings of the I.R.E, 1948, 4 pages.
"Inside the Magic Pocket," Dropbox Tech Blog, Searching Blog, retrieved from https://blogs.dropbox.com/tech/2016/05/insidethemagicpocket/ on Sep. 29, 2016, 16 pages.
International Search Report and Written Opinion for Application No. PCT/US2017/036195 dated Aug. 29, 2017, 8 pages.

(56) References Cited

OTHER PUBLICATIONS

International Telecommunication Union, ITU-T, T.81, "Series T: Terminals for Telematic Services", 1992, 12 pages.
International Telecommunication Union, "Terminal Equipment and Protocols for Telematic Services", CCITT, Sep. 1992, 186 pages.
International Telecommunications Union, "ITU-T T.81 (JPEG-1)—based Still-image Coding using an Alternative Arthmetic Coder," Sep. 2005, 24 pages.
"Introducing the 'mozjpeg' Project | Mozilla Research," retrieved from https://blog.mozilla.org/research/2014/03/05/introducingthemozjpegproject/, last accessed on Sep. 29, 2016, 2 pages.
Lakhani G., "DCT Coefficient Prediction for JPEG Image Coding," IEEE, 2007, 4 pages.
Independent JPEG Group, http://www.ijg.org/, last viewed on Sep. 29, 2016, 1 page.
LZMA SDK (Software Development Kit), retrieved from http://www.7zip.org/sdk.html on Sep. 29, 2016, 2 pages.
Mahoney M., "Data Compression Programs," http://mattmahoney.net/dc/ last viewed on Sep. 29, 2016, 9 pages.
Marpe D., et al., "Context-based Adaptive Binary Arithmetic Coding in the H.264/AVC Video Compression Standard," IEEE Transactions on Circuits and Systems for Video Technology, vol. 13, No. 7, Jul. 2003, pp. 620-636.
Matsakis, et al., "The Rust Language," ACM, 2014, 1 page.
Merritt L., et al., "X264: A High Performance H.264/AVC Encoder," 2006, 15 pages.
Mitzenmacher, et al., "The Power of Two Random Choices: A Survey of Techniques and Results," 2000, 60 pages.
Notice of Reasons for Refusal for Japanese Application No. 2018-550540 dated Dec. 2, 2019, 10 pages.
Notice of Allowance from U.S. Appl. No. 16/205,114, dated May 1, 2020, 7 pages.
Notice of Allowance for U.S. Appl. No. 15/281,604 dated Mar. 7, 2017, 8 pages.
Notice of Allowance for U.S. Appl. No. 15/614,860 dated Jul. 26, 2017, 9 pages.
Notice of Allowance for U.S. Appl. No. 15/822,401 dated Oct. 31, 2018, 9 pages.
Office Action for U.S. Appl. No. 15/281,604 dated Nov. 14, 2016, 10 pages.
Office Action for U.S. Appl. No. 15/822,401 dated Mar. 5, 2018, 11 pages.
Ponomarenko N., et al., "Additional Lossless Compression of JPEG Images," ISPA 2005, Proceedings of the 4th International Symposium on Image and Signal Processing and Analysis, doi:10.1109/ISPA.2005.195394, ISSN 1845-5921, ISBN 978-953-18-4089-7, XP055407288, Jan. 1, 2005, pp. 117-120.
Richgel G., "LZHAM—Lossless Data Compression Codec with LZMA-like Ratios but 1.5x-8x Faster Decompression Speed," C/C++, last accessed on Sep. 29, 2016, 5 pages.
Rissanen, et al., "Arithmetic Coding," IBM Journal of Research and Development, 1979, 14 pages.
Stirner M., et al., "Improved Redundancy Reduction for JPEG Files," Picture Coding Symposium by ERASIP, 2007, 4 pages.
Teuhola J., "A Compression Method for Clustered Bit-Vectors," Information Processing Letters, Oct. 1978, vol. 7(6), 4 pages.
TinyPNG Compress PNG Images While Preserving Transparency, "Smart PNG and JPEG Compression," retrived from https://tinypng.com/ on Sep. 29, 2016, 3 pages.
Wallace G., "The JPEG Still Picture Compression Standard," IEEE, Dec. 1991, 17 pages.
Wang, et al., "Undefined Behavior: What Happened to My Code?" APSys '12, Jul. 23-24, 2012, Seoul, S.Korea, ACM, 2012, 6 pages.
WebM, "Developer Overview," retrieved from https://plus.google.com/108064614949575764375/, last accessed on Sep. 29, 2016, 6 pages.
Witten, et al., "Arithmetic Coding for Data Compression", ACM, 1987, 21 pages.
Wu H., et al., "Lossless Compression of JPEG Coded Photo Collections," IEEE Transactions on Image Processing, vol. 25, No. 6, Jun. 2016, pp. 2684-2696 (13 pages).
Wu H., et al., "Lossless Compression of JPEG Coded Photo Collections," IEEE Transactions on Image Processing, IEEE Service Center, Piscataway, NJ, US, Apr. 27, 2016, XP011607696, vol. 25, No. 6, doi:10.1109/TIP.2016.2551366, ISSN 1057-7149, Jun. 1, 2016, pp. 2684-2696.
Ziv, et al., "A Universal Algorithm for Sequential Data Compression," IEEE Transactions on Information Theory, vol. IT-23, No. 3, May 1977, 7 pages.
Notice of Acceptance for Australian Application No. 2019261742 dated Jan. 15, 2021, 3 pages.
Examination Report No. 1, for Australian Application No. 2021202035, dated Oct. 20, 2021, 3 pages.

\* cited by examiner

*Figure 10*

LOSSLESS COMPRESSION OF DIGITAL IMAGES USING PRIOR IMAGE CONTEXT

CROSS-REFERENCE TO RELATED APPLICATIONS

This application claims the benefit as a continuation of U.S. patent application Ser. No. 16/205,114 filed Nov. 29, 2018; which is a continuation of U.S. patent application Ser. No. 15/822,401 filed Nov. 27, 2017 now U.S. Pat. No. 10,171,820 issued Jan. 1, 2019; which is a continuation of U.S. patent application Ser. No. 15/614,860, filed Jun. 6, 2017 now U.S. Pat. No. 9,832,475 issued Nov. 28, 2017; which is a continuation of Ser. No. 15/281,604, filed Sep. 30, 2016 now U.S. Pat. No. 9,712,830 issued Jul. 18, 2017, which claims priority to U.S. provisional application Ser. No. 62/395,269, filed Sep. 15, 2016, the entire contents of each of which is hereby incorporated by reference as if fully set forth herein. The Applicant hereby rescinds any disclaimer of claim scope in the parent applications or the prosecution history thereof and advise the USPTO that the claims in this application may be broader than any claim in the parent applications.

TECHNICAL FIELD

The disclosed implementations relate generally to lossless digital image compression. The disclosed implementations relate more specifically to techniques for lossless compression of a digital image using prior image context.

BACKGROUND

In the last decade, centrally hosted network filesystems with disconnected operation have grown to serve hundreds of millions of users. These services include SugarSync®, Dropbox®, Box®, Google Drive®, Microsoft OneDrive®, and Amazon Cloud Drive®.

Commercially, these systems typically offer users a maximum storage quota in exchange for a flat monthly fee, or no fee at all. Meanwhile, the cost to operate such a system increases with the amount of user data stored. Therefore, operators benefit from techniques that reduce the net amount of user data stored.

These filesystems can rapidly become gargantuan. For example, one of the above-mentioned services currently stores roughly one Exabyte of user data of which roughly 40% is made of baseline compressed JPEG images.

Baseline Joint Photographic Experts Group (JPEG) image compression encompasses a lossy encoding process based on a discrete cosine transform (DCT). In the encoding process, source image data is grouped into 8 by 8 blocks of samples. Each sample block is transformed by a forward DCT into a set of 64 values referred to as DCT coefficients. Of the 64 values, one of the values is referred to as the DC coefficient and the other 63 values as the AC coefficients. Each of the 64 coefficients are quantized using one of 64 corresponding values from a quantization table.

After quantization, the quantized DC coefficient and the 63 quantized AC coefficients are entropy encoded. In doing so, the previous quantized DC coefficient is used to predict the current quantized DC coefficient, and the difference is encoded. The 63 quantized AC coefficients are converted into a zig zag sequence. The quantized DCT coefficients are then passed to a Huffman encoding procedure which compresses the data further.

For decoding the compressed JPEG image data, essentially the inverse of the encoding steps is performed. The entropy decoder decodes the zig zag sequence of quantized DCT coefficients. After dequantization, the DCT coefficients are transformed to an 8×8 block of samples by an inverse DCT (IDCT).

Large-scale centrally hosted network filesystems such as those mentioned above would appreciate techniques providing greater compression efficiency relative to baseline JPEG. Such techniques could be employed to reduce the total size of the user data corpus stored and thereby reduce operating costs.

Methods exist for improved image compression relative to baseline JPEG. In one approach named "packJPG," segmented entropy encoding is employed about the End-of-Block (EOB) of the 8 by 8 DCT transformed block. The EOB is defined as the position after the last non-zero coefficient in the zig-zag order of the 64 coefficients. The packJPG approach purportedly can reduce baseline JPEG image file sizes by an average of 15%. More information on packJPG is available in the paper by Stirner M. and Seelmann G., "Improved Redundancy Reduction for JPEG Files," Picture Coding Symposium by ERASIP, November 2007.

While the packJPG approach can recompress a baseline JPEG file with a reduced file size, the packJPG approach requires re-arranging compressed pixel values in a globally sorted order. Thus, decompressing a packJPG compressed image to the original baseline JPEG image may be single-threaded, may require access to the entire packJPG compressed image, and may require decoding the packJPG compressed image into memory before a first byte of the original baseline JPEG compressed image can be output. Overall, the time-to-first byte and the time-to-last byte for the decompression operation may be too high to meet the service goals of large-scale centrally hosted network filesystems such as those mentioned above.

What is needed, then, are image recompression techniques that can be implemented without global operations so that the decompression operation to recover the original compressed image from the recompressed image can be distributed across independent portions of the recompressed image and, within each portion, multithreaded and with low time-to-first byte.

BRIEF DESCRIPTION OF THE DRAWINGS

FIG. 10 depicts the samples involved in a local brightness prediction methodology per some implementations of the present invention.

DETAILED DESCRIPTION

Figure 1:
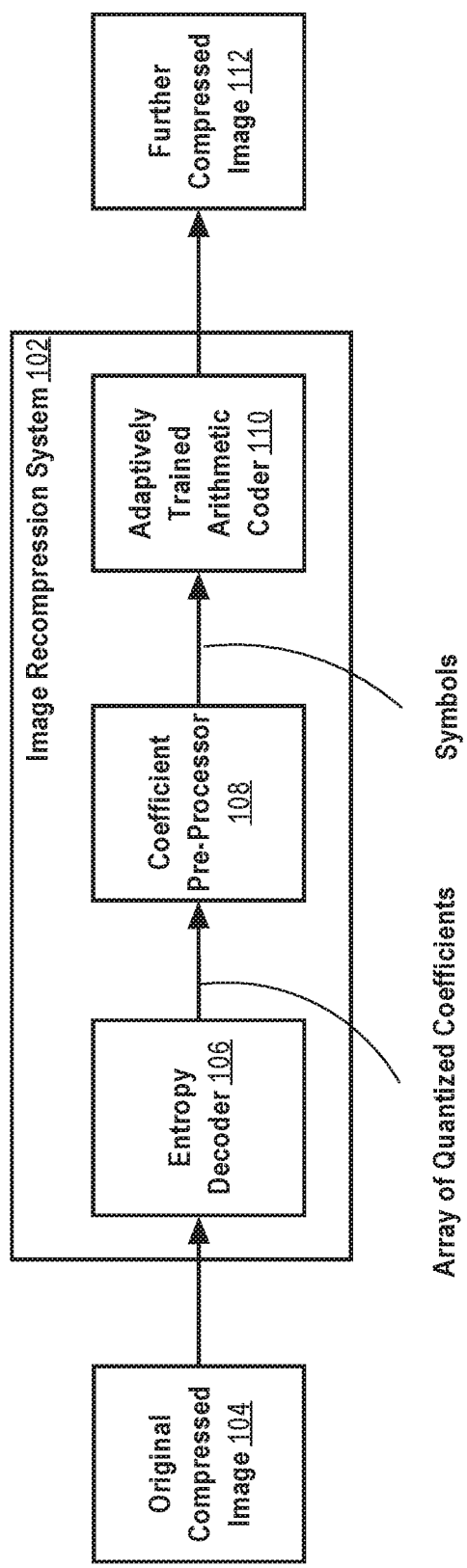
FIG. 1 depicts an image recompression system per some implementations of the present invention.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Throughout the specification and claims, the following terms take the meanings explicitly associated herein, unless the context clearly dictates otherwise. The phrase "in some implementations," as used herein, do not necessarily refer to the same implementation(s), though it may. Thus, various implementations may be readily combined, without departing from the scope or spirit of the invention.

In addition, as used herein, the term "or" is an inclusive "or" operator, unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Glossary

The following definitions are provided for purposes of illustration, not limitation, to assist with understanding the discussion that follows.

Component: A component may be defined as one of the two-dimensional arrays of an image.

Compressed Image (Compressed Image Data): A compressed image (or compressed image data) is a coded representation of an image.

Dequantization: Dequantization is the inverse procedure to quantization by which a representation of the frequency-space coefficients is recovered.

Image (Image Data): An image (or image data) may be defined as a set of two-dimensional arrays of numerical data, one two-dimensional array for each component of the image and where the component(s) of the image have more than one bit per sample (sometimes referred to as a continuous-tone image). An image can be a color image or a greyscale image. A color image has multiple components. A greyscale image has only one component.

Joint Photographic Experts Group (JPEG): JPEG is the name of a committee that creates specifications for digital compression and coding of continuous-tone still images.

Quantization: Quantization is a procedure by which frequency-space coefficients are linearly scaled to achieve compression.

Quantization Table: A quantization table is a set of 64 quantization values used to quantize and dequantize frequency-space coefficients.

Quantization Value: An integer value used in quantization.

Sample: A sample refers to one element in the two-dimensional array of a component.

Overview

Format-aware and file preserving techniques for lossless recompression of a previously compressed image providing greater compression savings are disclosed. For example, the recompression techniques may be applied to a baseline JPEG image to achieve on average an 23% compression savings. The techniques avoid global operations during recompression that would defeat distributed and multi-threaded decompression operations when recovering the original compressed image from the recompressed image. For example, the techniques do not require arranging all the compressed pixel values in a globally sorted order that would defeat distributed and multithreaded decoding of the recompressed image. At the same time, the techniques can achieve compression savings while facilitating distributed and multithreaded decompression.

To achieve additional compression savings while avoiding global operations such as global sorting, the techniques, per some implementations of the present invention, involve replacing the Huffman coding scheme of baseline JPEG with an arithmetic coding scheme. The arithmetic coding scheme uses an adaptive probability model to produce accurate predictions for DCT coefficients in the original image based on the context available earlier in the original image. Specifically, the probability model uses an array of statistical bins. Each statistical bin tracks the probability of a "one" vs a "zero" bit given a prior context in the image.

To avoid global operations such as sorting that defeat distributed and multithreaded decompression, the probability model is expanded to cover correlations across long distances in the image without needing to sort the image data. Per some implementations of the present invention, the probability model encompasses 721,564 statistical bins (i.e., probability contexts).

Image Recompression System

FIG. 1 schematically depicts an image recompression system 102 per some implementations of the present invention. The system 102 encompasses an entropy decoder 106, coefficient pre-processor 108, and an adaptively trained arithmetic coder 110. In operation, original compressed image data 104 produced by an original image encoder (not shown) may be input to entropy decoder 106 to obtain an array of quantized frequency-space coefficients, grouped into sets or "blocks" of 64 quantized coefficients ($\beta_1(\alpha_{1:1}, \alpha_{1:2}, \alpha_{1:3} \ldots \alpha_{1:64}) \ldots \beta_n(\alpha_{n:1}, \alpha_{n:2}, \alpha_{n:3} \ldots \alpha_{n:64})$). The array of quantized frequency-space coefficients may be an array of quantized Discrete Cosine Transform (DCT) coefficients, for example.

The original compressed image 104 may encompass two sections, a "header" section and a "scan" section. The scan section may encode the array of quantized coefficients. Each block of 64 quantized coefficients may sum together with a series a frequency-space orthogonal patterns to describe an 8 by 8 sample block of one component (e.g., luma or chroma) of an image. The quantized coefficients may be these frequency-space coefficients divided by quantization values present in a quantization table.

The header of the original compressed image 104 may contain various image-related information including image metadata such as image width, image height, number of components, custom tags, etc.), quantization table(s), and Huffman table(s). A quantization table may record the quantization values applied to the frequency-space coefficients during quantization by the original image encoder. A Huffman table may record variable length codes that were used during entropy encoding by the original image encoder to encode, in a lossless manner, the array of quantized coefficients that comprise the scan section of the original compressed image data 104.

The original compressed image 104 may be a baseline JPEG image in compliance with ISO/IEC 10918-1, its progeny, or the equivalent. However, implementations of the present invention are not limited to baseline JPEG. The image recompression techniques disclosed herein may be applied to other image formats having an array of quantized coefficients, grouped into blocks of 64 quantized coefficients.

The image recompression system 102 may produce a further compressed image 112 from an original compressed image 104 that further compresses the original image. In some implementations of the present invention, where original compressed image 104 is a baseline JPEG image, recompression techniques disclosed herein may be implemented to achieve on average approximately 23% additional compression relative to baseline JPEG.

Per some implementations of the present invention, the header of the original compressed image 104 is compressed by the system 102 using a known lossless data compression algorithm such as one that uses a combination LZ1 or LZ2 and Huffman coding. The compressed header is included in the further compressed image 112. However, instead of encoding the quantized coefficients from the original compressed image 104 using Huffman tables, the image recompression system 102 encodes the quantized coefficients in the further compressed image 112 using an arithmetic coder 110 with probabilities driven by an adaptive trained probability model. Specifically, the probability model is adaptively trained by context information gathered from previous sections of the image.

The entropy decoder 106 may undo the entropy encoding (e.g., Huffman coding) applied by the original image encoder and produce the array of quantized coefficients. As mentioned, the system 102 may apply a different entropy encoding scheme to the quantized coefficients after pre-processing them as described in greater detail hereafter. The different entropy encoding scheme may encompass an adaptively trained binary arithmetic coding procedure that is supplied with carefully chosen context information from previous sections of the image. More specifically, the arithmetic coding procedure may encompass a custom probability model that is adaptively trained by context information gathered from previous sections of the image. The arithmetic coding procedure and probability model are also described in greater detail hereafter.

As described in greater detail hereinafter, the coefficient pre-processor 108 may pre-process the array of quantized coefficients and emit symbols for entropy encoding by the arithmetic coder 110. The pre-processing performed by the coefficient pre-processor 108 may generally involve binarizing the array of quantized coefficient as a sequence of binary symbols which are then input to the arithmetic coder 110. The pre-processing performed by the coefficient pre-processor 108 may also generally involve gathering context information from previous sections image for use in adaptively training the probability model used by the arithmetic coder 110.

Example Applications

There are several useful applications for image recompression system 102. In some implementations, image recompression system 102 is used to further compress original compressed image 104 before storage or transmission of further compressed image 112. By doing so, network resources that would otherwise be consumed by transmitting the larger original compressed image 104 are conserved by transmitting instead the further compressed image 112. Similarly, storage resources that would otherwise be consumed storing the larger original compressed image 104 are conserved by storing instead the further compressed image 112. An image decompression system that essentially performs the inverse of image recompression system 102 may be used to recover the original compressed image 104 from the further compressed image 112.

Centrally Hosted Network Filesystem Application

In some implementations, image recompression system 102, and a corresponding image decompression system that essentially reverses the recompression applied by system 102, are used by a centrally hosted network filesystem that stores (hosts) users' digital photos and digital images to reduce the amount of data storage space required to store the digital photos and digital images. In some implementations, the original compressed image 104 may be, for example, a digital photo captured by a user's mobile phone and uploaded to the online service. After receiving the original compressed image 104, the image recompression system 102 may be used to produce further compressed image 112 after which the original compressed image data 104 may be discarded or archived. When the user requests the original compressed image 104 from the network filesystem, the image decompression system may be used to reproduce the requested original compressed image 104 from the previously generated and stored further compressed image 112. After storing further compressed image 112 and before the user requests to download original compressed image 104, only the further compressed image 112 may be stored and not the original compressed image 104 thereby conserving data storage resources consumed by the network file system. By implementing recompression techniques disclosed herein, a significant reduction in the amount of data storage resources needed by the network filesystem may be realized.

Distributed and Multithreaded Decompression

In some implementations, the image recompression system 102 and the corresponding image decompression system execute on a cluster of back-end servers. The image decompression system in some implementations may be configured to perform real-time distributed and multithreaded decompression of a further compressed image 112. The decompression may be capable of being distributed across segments of the further compressed image 112. The segments may be distributed across multiple back-end servers. Each segment may store a portion of the further compressed image 112 up to a maximum segment size such as, for example, 4 Megabytes. The image decompression system is configured to decompress each segment independently without access to the other segments.

Segments of an original compressed image 102 may be requested by a client (e.g., over an Internet connection) individually and independently of each other. When a segment of an original compressed image 102 is requested, to begin streaming the requested segment as soon as possible and at a network transfer rate (e.g., greater than 100 Megabits per second) that sufficiently utilizes the bandwidth client's Internet connection, the decompression of a corresponding segment of the further compressed image 112 may be multithreaded. Specifically, each thread may produce a portion of the requested segment of the original compressed image 102 from a portion of a corresponding segment of the further compressed image 112. The portions of the requested segment produced by the multiple threads may then be concatenated together to produce the requested segment of the original compressed image 102.

Personal Computing Device Application

In some possible implementations, the image recompression system 102 and corresponding image decompression system are similarly used at a client computing device or at a personal computing device to similarly compress an original compressed image 104 to a corresponding further compressed image 112 for storage at the device or transmission to another device. For example, an application (e.g., a web browser or mobile application) on a camera-equipped portable computing device may use image recompression system 102 to further compress an original compressed image 104 produced by a camera module of the portable computing device and store the corresponding further compressed image 112 at the device instead of storing the original compressed image 104 at the device. This conserves precious data storage resources of the portable computing device. When needed, the application may use the corresponding image decompression system to recover the original compressed image 104 from the further compressed image 112 stored at the device.

Web Browser Application

In some implementations, the image decompression system may be implemented in a client-side browser-supported scripting language such as JAVASCRIPT or the like to provide backward compatibility support for a further compressed image 112 in web browsers that are not configured to decode the further compressed image 112. In some implementations, a server can send scripting language instructions implementing the image decompression system and a further compressed image 112 to a client web browser (e.g., as part of a web page). The client web browser can then execute the scripting language instructions to obtain an original compressed image 104 (e.g., a baseline JPEG image) from the further compressed image 112 that the client web browser can decompress. The client web browser can then decompress the original compressed image 104 to obtain an image that may be displayed in a video display.

Other Application Considerations

The above-described image recompression system 102 is presented for purposes of illustrating some system implementations for the present invention. The present invention, however, is not limited to any system or system configuration. An image recompression system or an image decompression system is not necessary to the invention, but is used to provide a framework for discussion. Instead, the present invention may be implemented in any type of system architecture or processing environment capable of supporting the methodologies of the present invention presented in detail herein.

In FIG. 1, for providing a clear example, various labeled boxes are used to represent a set of related operations performed in software or hardware, or a combination thereof. For example, the box labeled coefficient pre-processor 108 is used to represent operations disclosed herein in pre-processing an array of quantized coefficients for arithmetic coding. However, the labeled boxes may or may not have direct software and/or hardware structural correspondence in the implementation at hand. For example, what is structurally considered to be a coefficient pre-processor in the implementation at hand may perform some of the operations described herein as being performed by the entropy decoder 106 and/or the arithmetic coder 110, and/or vice versa.

Arithmetic Coding

Arithmetic coding is a technique for lossless data compression. In arithmetic coding, generally, an entire data stream of binary symbols is represented as a single contiguous range on the number line between 0 and 1. The binary fractional digits required to encode a point within the range can describe the data stream in its entirety.

One possible technique for arithmetically coding a data stream may simply divide the number line in half recursively for each binary symbol encoded, with the lower half representing one binary symbol and the upper half representing the other binary symbol. This possible technique may require a final exponential range of the number line that yields no compression. A less naïve technique may divide the number line into uneven ranges, where a larger range can be chosen beforehand for a more likely upcoming binary symbol to be encoded. This technique is generally known as adaptive binary arithmetic coding.

With adaptive binary arithmetic coding, several semantically-aware probability models may be maintained for various image situations that may arise. A range on the number line for upcoming binary symbols to be encoded may then be chosen based on the probability models. The range chosen may depend on the image features already binarized. Such features may include, for example, the magnitude of a previous error correction term on the brightness of a block. Probabilities may be tracked in a memory location indexed by the set of past features observed. For example, the magnitude of the previously binarized error term may be categorized into one of the following categories: zero, small positive, small negative, large positive, or large negative. Upon encountering each new binary symbol encoding the brightness error correction, one of the five memory locations may be chosen and statistics for each situation may be tracked separately. The currently selected memory location may drive the choice of how to divide the number line for the current and upcoming binary symbols to be encoded.

Adaptively Trained Probability Model

The inventive techniques disclosed herein may encompass an arithmetic coder that uses an adaptively trained probability model. The probability model may comprise locations in memory referred to herein as "statistical bins" or just "bins" for short. In some implementations of the present invention, the probability model consists of 721,564 statistical bins. Each statistical bin tracks probabilities in a variety of situations (i.e., probability contexts) for different types of quantized coefficients in a block.

Figure 2:
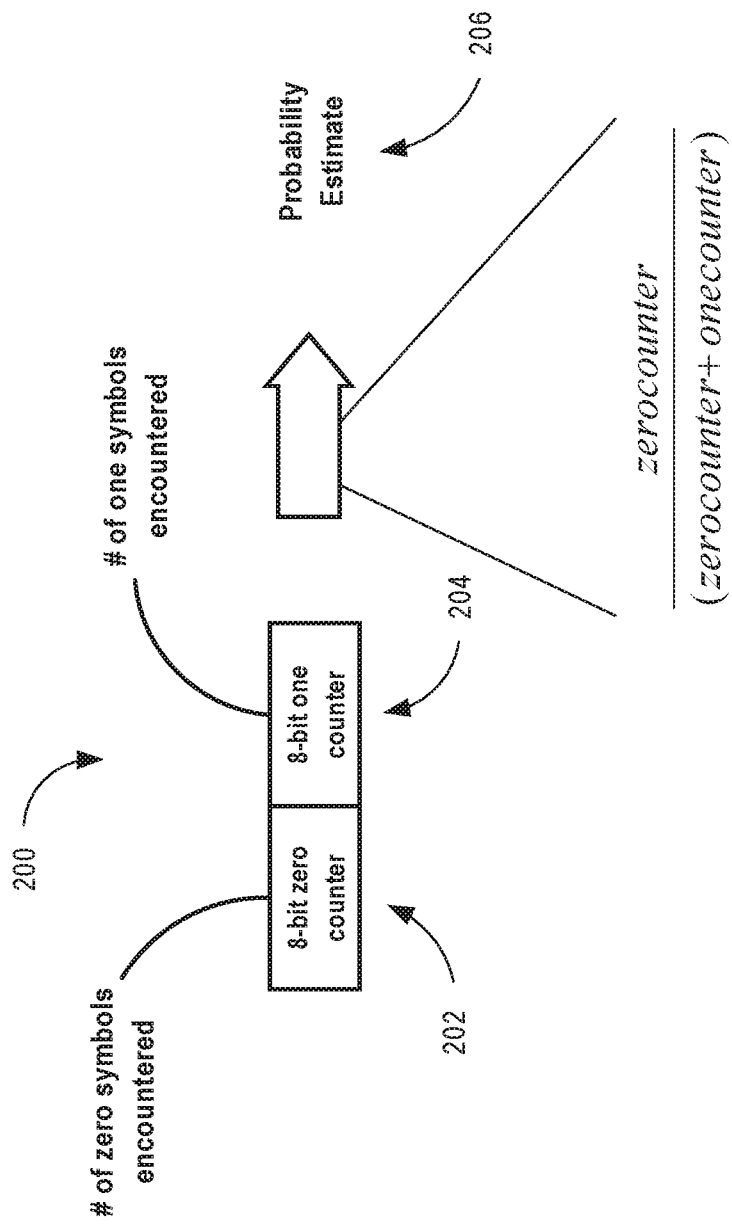
FIG. 2 schematically depicts a statistical bin of an adaptively trained probability model used in an arithmetic coding procedure per some implementations of the present invention.

FIG. 2 schematically depicts a statistical bin 200 in memory. The bin 200 may represent one of the 721,564 different situations in the image, for example. The bin 200 includes an 8-bit "zero" counter 202 that tracks the number of zero symbols encountered in the situation and an 8-bit "one" counter 204 that tracks the number of one symbols encountered in the situation. The bin 200 may be initialized with two samples, one of each variety. If either the zero counter 202 or the one counter 204 overflows, then both counters 202 and 204 may be divided by two and rounded up if necessary.

A probability estimate 206 may be computed from the counters 202 and 204 by dividing the zero counter 202 by the sum of the zero counter 202 and the one counter 204. The number line may then be cut so that the length of each split of the number line corresponds with the probability estimate 206.

As mentioned, the probability contexts represented by the statistical bins 200 may encompass the type of DCT coefficient. For example, one type of coefficient is the "DC" which represents the average brightness or color over a sample block. Another type of coefficient is an "AC" coefficient. As described in greater detail below, a probability context may also encompass an index of AC coefficient within a DCT block.

Per some implementations of the present invention, each DCT coefficient is represented in a binarized form with an Exp-Golomb code or an Exp-Golomb-like code discussed in greater detail below. A statistical bin 200 is used to track the likelihood of a "one" symbol (e.g., a "one" bit) in the binarized form considering the values of already-encoded coefficients that may be correlated.

Initially, the statistical bins 200 are each initialized to a 50-50 probability of ones vs zeroes. The probabilities are then adapted as the coefficients are encoded (or decoded), counting the number of ones and zeros seen in each of the probability contexts.

Statistical bins 200 may be independent such that a "one" symbol encountered in one probability context does not affect the prediction may in another probability context. The number of arrangement of statistical bins is selected such that useful information is learned from similar probability contexts.

Per some implementations of the present invention, for each block of 64 quantized DCT coefficients corresponding to an 8×8 sample block of one component of an image, 49 AC coefficients in a 7×7 sub-block, 14 "edge" AC coefficients of horizontal (1×7) and vertical (7×1) variation, and 1 DC coefficient are separately encoded.

Per some implementations of the present invention, for an AC coefficient in the 7×7 sub-block, the bits of the binarized form of the AC coefficient are predicted using the corresponding AC coefficient in an above DCT block, a left DCT block, and an above-left DCT block. For example, the bins 200 for bits of the binarized form may be selected based on $\langle i, \lfloor\log_2|A_i|\rfloor, \lfloor\log_2|L_i|\rfloor, \lfloor\log_2|AL_i|\rfloor\rangle$. Here, i is an index of the AC coefficient within DCT block, $A_i$ represents the coefficient at the same index in the above DCT block, $L_i$ represents the coefficient at the same index in the left DCT block, and $AL_i$ represents the coefficient at the same index in the above-left DCT block Per some implementations of the present invention, for the and 7×1 edge, an entire column of a two-dimensional (2-D) DCT is transformed into a one dimensional (1-D) DCT of an edge row. In this manner, pixel-adjacent 1-D DCT coefficients are obtained from the lower-most row of the DCT block above and the top row of the currently decoding DCT block. Likewise, for the 1×7 edge, the neighboring right most column of the DCT block to the left may be used as a prior for the left most 1-D DCT column of the currently decoding block.

Per some implementations of the present invention, to predict the DC coefficient, it is assumed that image gradients across blocks are smooth. Linearly extrapolating the last two rows of pixels of the above and left blocks yields 16 edge pixel values. AC coefficients are used to compute a predicted DC offset which minimizes average differences between the decoded block's edge pixels and the edges extrapolated from neighbors. Only the delta between the predicted DC value and the true DC value is encoded, so close predictions yield small output sizes. Per some implementations, additional compressed gains are achieved by indexing the statistical bins by outlier values and the variance of edge pixels so to enable the probability model to adapt to non-smooth gradients.

Adaptively Trained Arithmetic Coding Procedure

As mentioned, the adaptively trained arithmetic coder of the present invention may encompass a probability model that is adaptively trained by context information gathered from previous sections of the image. When encoding a given set of upcoming symbols, the arithmetic coder may compute a probability estimate for diving the number line. The probability estimate may be computed based on the current zero and one counters in a selected bin of the probability model. The statistical bin to use for a given set of upcoming symbols may be determined based on the current situation for the given set of upcoming symbols.

Figure 3:
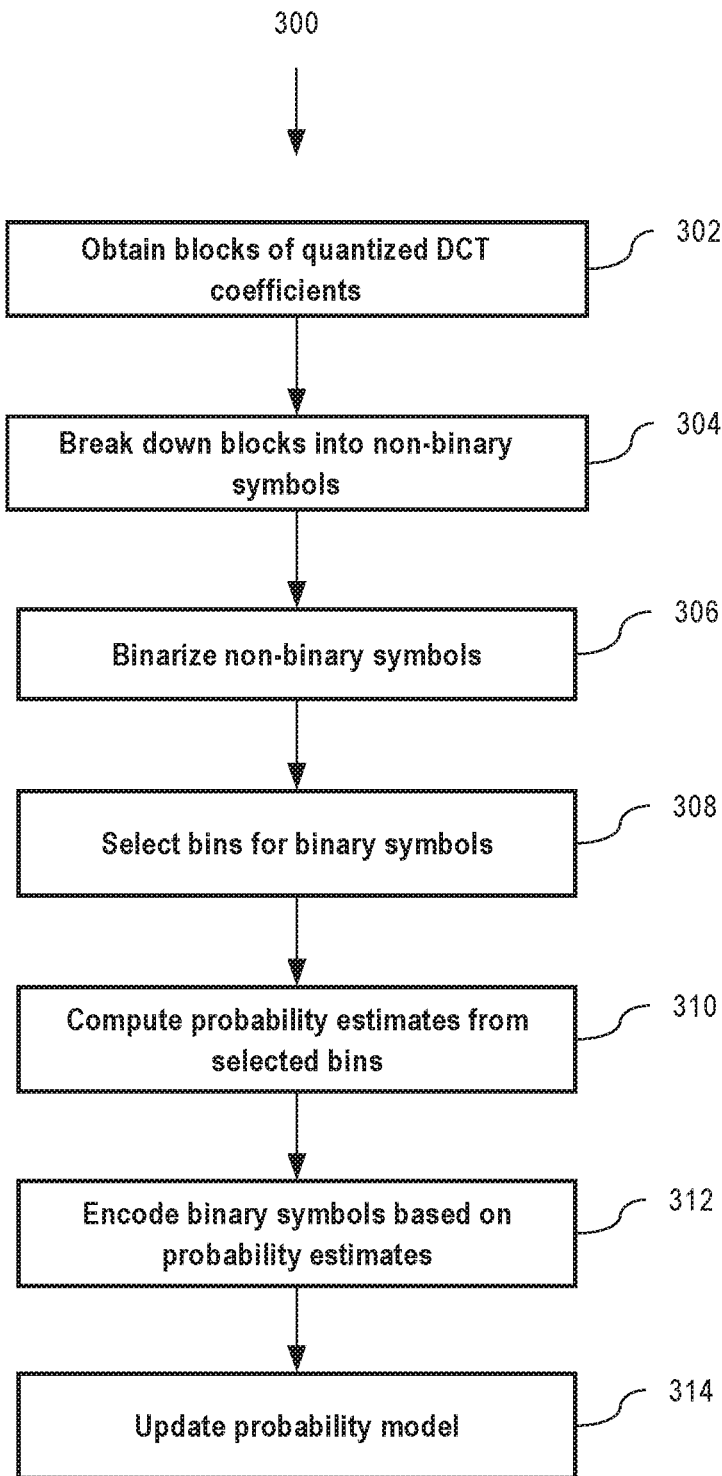
FIG. 3 is a flowchart of the high-level operations involved in an adaptively trained arithmetic coding procedure per some implementations of the present invention.

FIG. 3 is a flowchart of the high-level operations 302-314 involved in an adaptively trained arithmetic coding procedure per some implementations of the present invention. While depicted in FIG. 3 and described below in a certain order, performance of the operations 302-314 may overlap in a implementation at hand. For example, operations 302-3014 may be performed concurrently or in parallel in a implementation at hand. Thus, there is no requirement that an operation (e.g., 302) must be performed to completion before performance of the next depicted or described operation (e.g., 304) can begin, or even that the operations must begin in the order depicted.

Generally, the operations 302-314 are performed on an array of quantized coefficient blocks for a component of an image. If the image has multiple components (e.g., is a color image), then the operations 302-314 may be performed separately for each component where each component is represented by a separate array of quantized coefficient blocks.

Quantized DCT Block Processing Order

At operation 302, blocks of quantized coefficients corresponding to sample blocks an image component are obtained for processing per the remaining operations 304-314. The quantized blocks may be obtained in a raster scan order of left to right and top to bottom within the component where the four sides of the component are designated as top, bottom, left, and right with bottom opposite top and left opposite right. Because of the processing order, any quantized blocks "above" and to the "left" of a given quantized block are processed before the given quantized block. Thus, information determined by processing the above and left quantized blocks is available when the given quantized block is processed, assuming the above and left blocks are available for the given block.

Figure 4:
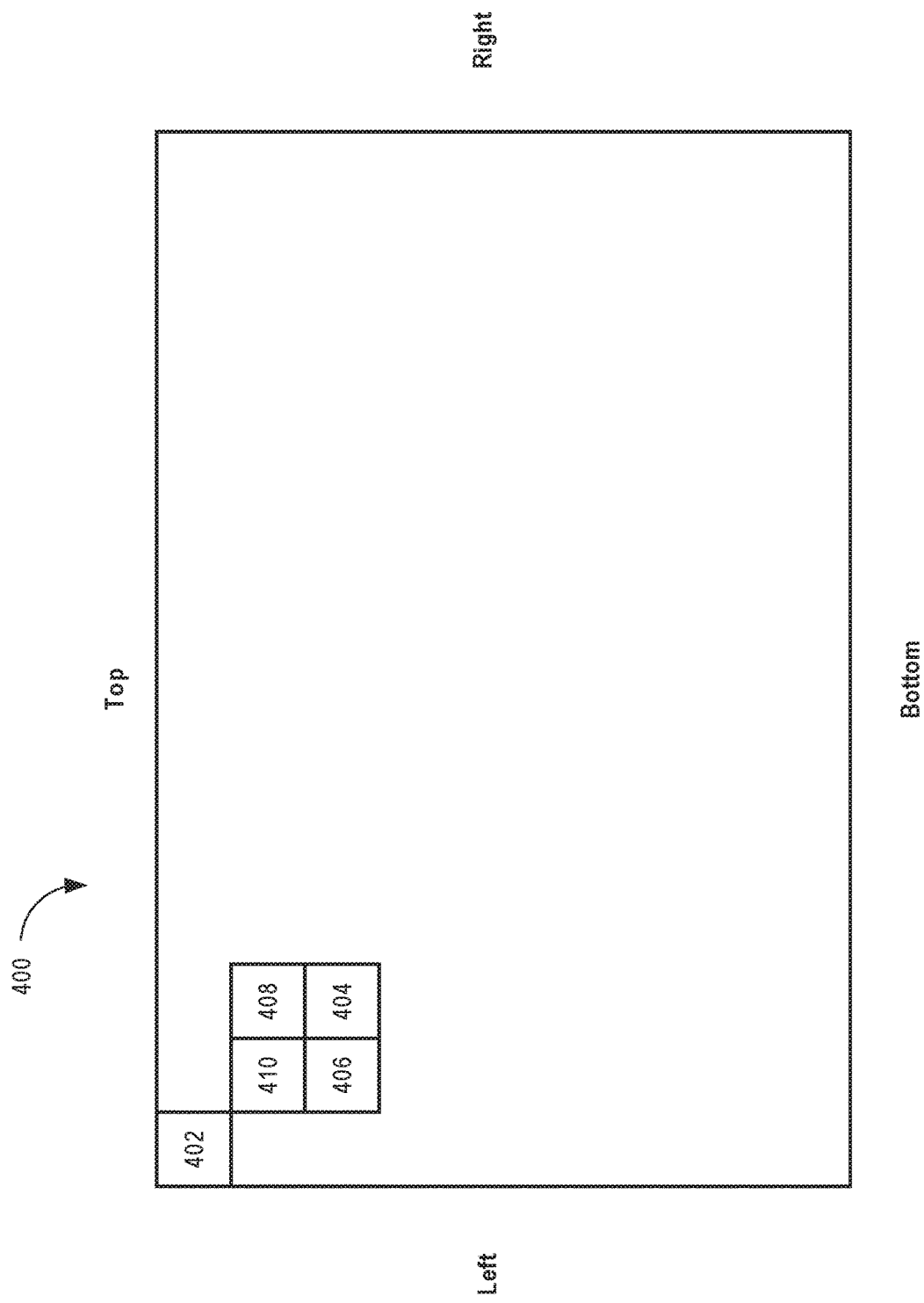
FIG. 4 schematically depicts an image component comprising sample blocks per some implementations of the present invention.

FIG. 4 schematically depicts an image component 400 having left, right, top, and bottom sides. Blocks of quantized coefficients corresponding to sample blocks of the component are processed in left to right, top to bottom order starting with the quantized block corresponding to sample block 402. A given quantized block may have a left block if the corresponding sample block is not in the left-most block column of the component. A given quantized block may have an above block if the corresponding sample block is not in the top-most block row of the component. A given quantized block may have an above-left block if the corresponding sample block is not in the left-most block column and not in the top-most block column of the component. For example, sample block 404 has an above block 408, a left block 406, and an above-left block 410. However, block 402 does not have any of these blocks because of its position within the component.

Quantized Coefficient Block Break Down (Categorization)

Figure 5:
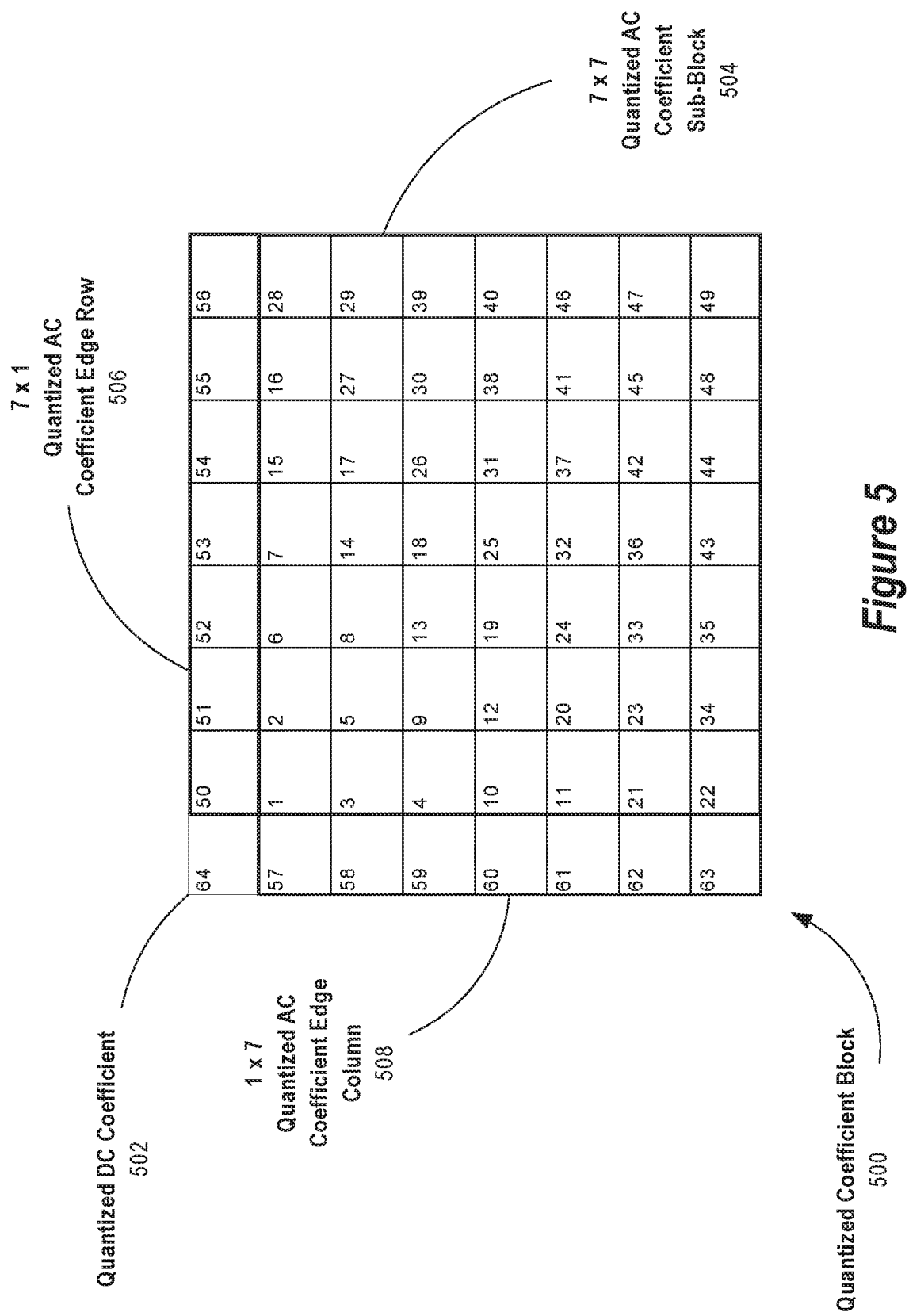
FIG. 5 depicts four general categories of quantized coefficients in a quantized coefficient block per some implementations of the present invention.

At operation 304, blocks of quantized coefficients are broken down (categorized) into non-binary symbols. Per some implementations of the present invention, the quantized coefficients of a quantized block are broken down into four general categories. The four general categorizes are illustrated in FIG. 5, which schematically depicts a block of 64 quantized coefficients 500. The block 500 may be one of the blocks of 64 quantized coefficients in the array of quantized coefficients recovered from the original compressed image. The block 500 may have 63 quantized AC coefficients (numbered 1 to 63 in FIG. 5) some or all of which may have a zero value because of quantization. The block 500 may also have a quantized DC coefficient 502 (numbered 64 in FIG. 5). The quantized DC coefficient 502 may represent the overall brightness of the 8 by 8 sample block of the image corresponding to the block 500. The higher quantized DC coefficient value, the brighter the samples of the corresponding sample block.

The 63 quantized AC coefficients of the block 500 may be further categorized into three sub-portions: a 7×7 sub-block 504 (quantized AC coefficients numbered 1-49 in FIG. 5), a 7×1 edge row 506 (quantized AC coefficients numbered 50-56), and a 1×7 edge column 508 (quantized AC coefficients numbered 57-63). The quantized AC coefficients of the 7×1 edge row 506 may comprise vertical patterns that occur at various increasing frequencies as they proceed farther from the DC. Likewise, the quantized AC coefficients of the 1×7 edge column 508 may comprise horizontal striped patterns of increasing frequency. The quantized AC coefficients in the 7×7 sub-block 504 may comprise checkered patterns that represent fine detail in the corresponding 8 by 8 sample block such as, for example, the texture of pebbles on a beach, or the pattern on a plaid shirt.

Binarization

At operation 306, non-binary symbols in the quantized coefficient blocks are binarized. Binarization may involve converting a non-binary symbol into a sequence of one or more binary symbols (e.g., a sequence of one or more bits).

Figure 6:
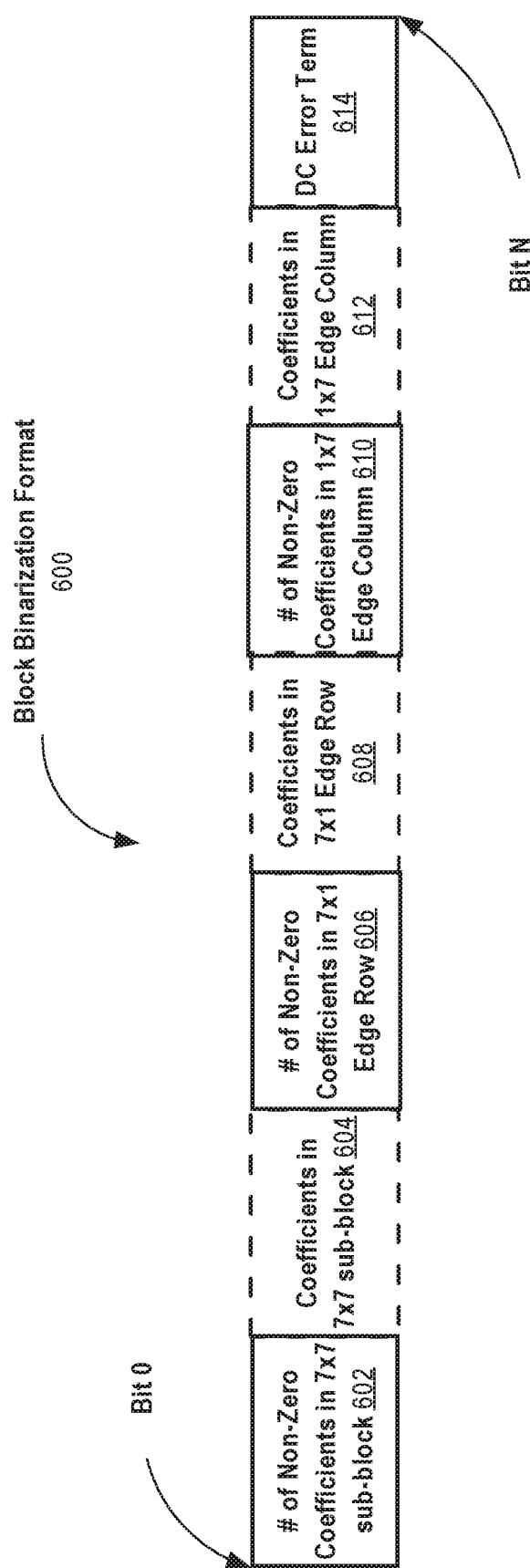
FIG. 6 depicts a binarization format for non-binary symbols of a categorized quantized coefficient block per some implementations of the present invention.

FIG. 6 schematically depicts a block binarization format 600 for non-binary symbols of a given categorized quantized coefficient block per some implementations of the present invention. The block binarization format 600 comprises a sequence of bits (binary symbols) starting a bit 0 and ending at bit N representing the non-binary symbols of the given block. The block binarization format 600 for the given block, per some implementations, includes, in the order listed below, a binarized form of the following non-binary symbols:

the number of non-zero quantized AC coefficients 602 in the 7×7 sub-block 504, followed by a number of quantized AC coefficients 604 from the 7×7 sub-block 504 where the number is greater than or equal to the number of non-zero quantized AC coefficients 602 in the 7×7 sub-block 504, followed by the number of non-zero quantized AC coefficients 606 in the 7×1 edge row 506, followed by a number of quantized AC coefficients 608 from the 7×1 edge row 506 where the number is greater than or equal to the number of non-zero quantized AC coefficients 606 in the 7×1 edge row 506, followed by the number of non-zero quantized AC coefficients 610 in the 1×7 edge column 508, followed by a number of quantized AC coefficients 612 from the 1×7 edge column 508 where the number is greater than or equal to the number of non-zero quantized AC coefficients 610 in the 1×7 edge column 508, and followed by a DC error term 614 which may be a delta of a prediction for the quantized DC coefficient 502.

In some implementations, the number of non-zero quantized AC coefficients 602 in the 7×7 sub-block 504 is from 0 and 49, inclusive, and binarized in the format 600 as a six-bit base-2 encoding of the number 602.

Figure 7:
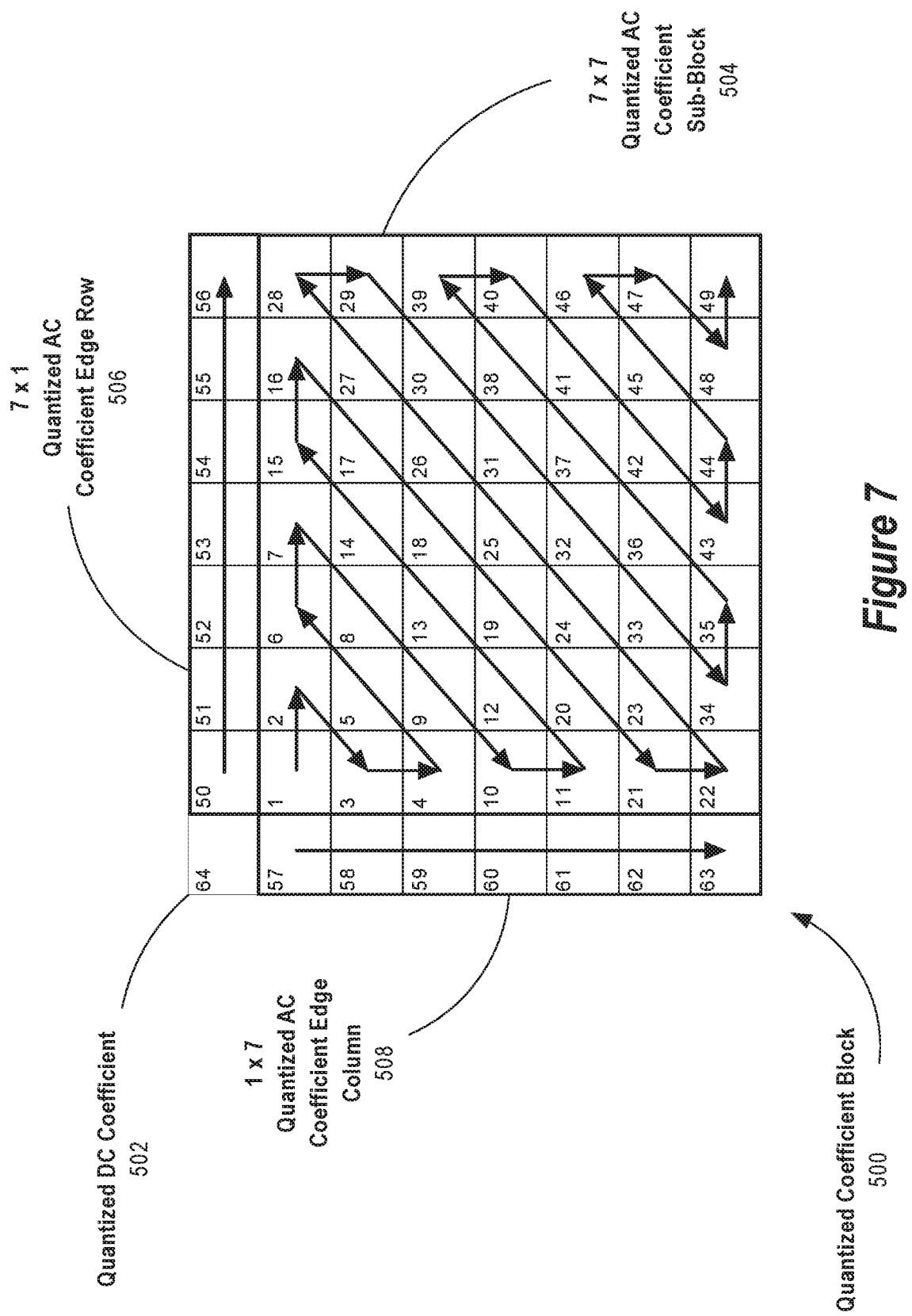
FIG. 7 depicts a binarization order of quantized coefficients in a block of quantized coefficients per some implementations of the present invention.

When binarizing the given block 500, the quantized AC coefficients of the 7×7 sub-block 504 may be binarized per a zig-zag scan order shown in FIG. 7, starting with the quantized AC coefficient numbered 1 in FIG. 7 and proceeding as depicted toward the quantized AC coefficient numbered 49 in FIG. 7. The zig-zag scan order allows fewer quantized AC coefficients to be serialized than if they were serialized in a raster scan order, thereby resulting in fewer symbols for the entropy coder to encode. Specifically, when serializing the quantized AC coefficients in the 7×7 sub-block 504, in-memory counter may be set to the number of non-zero quantized AC coefficients 602 in the 7×7 sub-block 504. The number of non-zero quantized AC coefficients 602 in the 7×7 sub-block 504 may be determined prior to binarizing the given block 500. For example, the number of non-zero quantized AC coefficients 602 in the 7×7 sub-block 504 may be determined when decoding the original compressed image to recover the given block 500 from the original compressed image.

Figure 8:
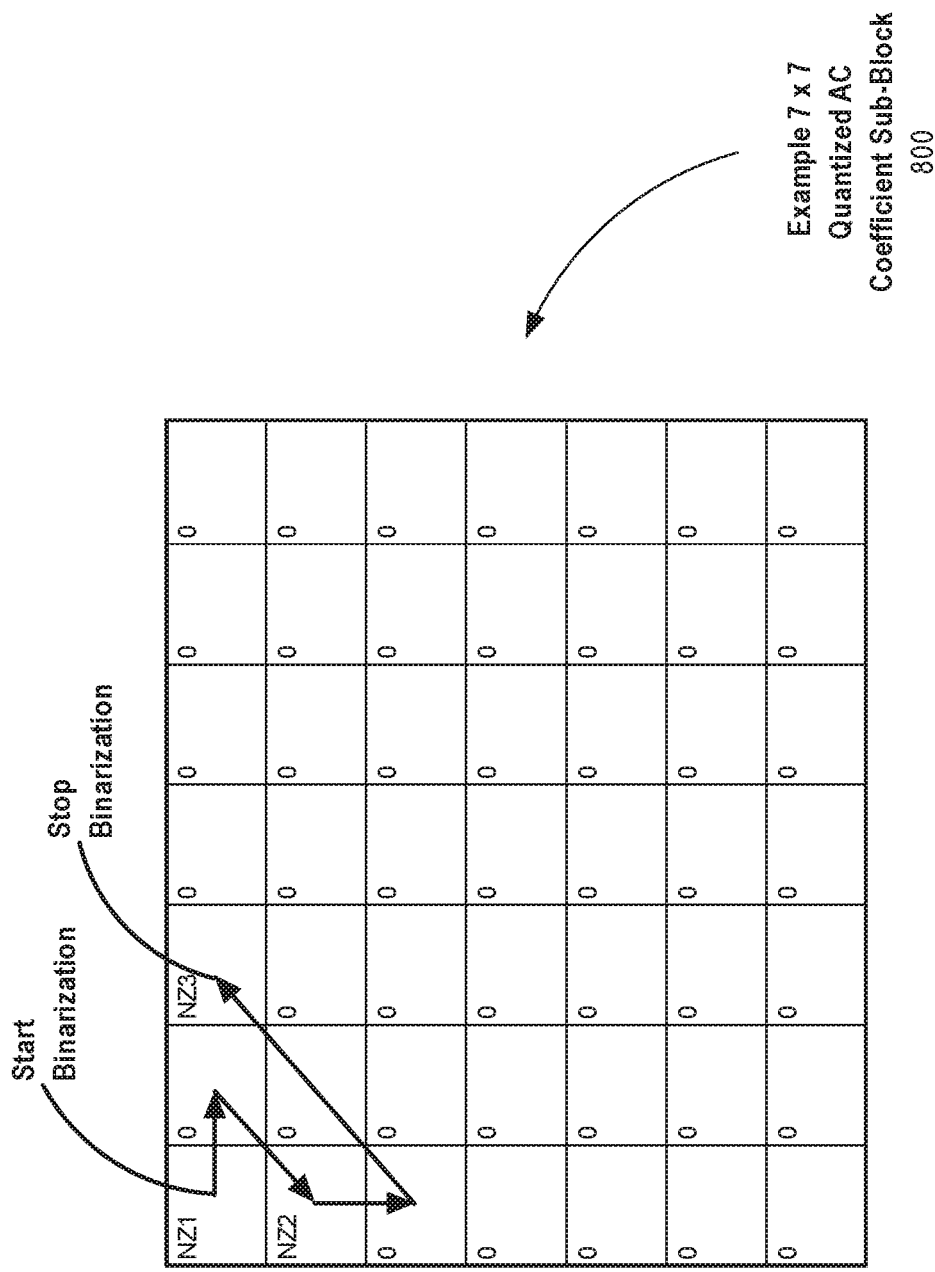
FIG. 8 depicts an example binarization procedure in a 7 by 7 sub-block of quantized AC coefficients per some implementations of the present invention.

Assuming the number of non-zero quantized AC coefficients 602 in the 7×7 sub-block 504 is greater than zero, the counter is decremented by one each time a non-zero quantized AC coefficient in the zig-zag scan order through the 7×7 sub-block 504 is binarized. Binarization of the 7×7 sub-block 504 may complete after the counter reaches zero. As an example, FIG. 8 schematically depicts an example 7×7 sub-block 800 of quantized AC coefficients having three non-zero AC coefficients at positions 1, 3, and 6 in the zig-zag scan order. Because the number of number of non-zero coefficients is known, serialization of the 7×7 sub-block 800 can stop after the third non-zero AC coefficient is encountered at position 6 as shown in FIG. 8. Moreover, for this sub-block 800, only six quantized AC coefficients need be binarized 604 in the format 600. Specifically, only the quantized AC coefficients at positions 1 through 6, inclusive, need be binarized. If the number of non-zero quantized AC coefficients 602 in the 7×7 sub-block 504 is zero, then no quantized AC coefficients 602 in the 7×7 sub-block 504 need be binarized in the format 600. This scenario is depicted in FIG. 6 by representing the quantized AC coefficients in 7×7 sub-block 504 with a dashed outlined box 604.

The 7×1 edge row 506 and the 1×7 edge column 508 may each be binarized in a similar manner to the 7×7 sub-block 504. Except the number of non-zero quantized AC coefficients 606 in the 7×1 edge row 506 and the number of non-zero quantized AC coefficients 610 in the 1×7 edge column 508 is a value in the range of 0 to 7, inclusive, and binarized in the format 600 as a three-bit base-2 encoding instead of a six-bit base-2 encoding. Another difference is that the scan order through these edge coefficients may be straight and may not have a zig-zag pattern as depicted in FIG. 7 with corresponding arrows through the sub-blocks 706 and 708. Similar with the 7×7 sub-block 504, if the number of non-zero coefficients in the 7×1 edge row 506 or the 1×7 sub-block 508 is zero, then binarization of the corresponding quantized AC coefficients in those blocks is not necessary as depicted with dashed outline boxes 608 and 612 in FIG. 6.

AC Coefficient and DC Error Term Binarization Format

Figure 9:
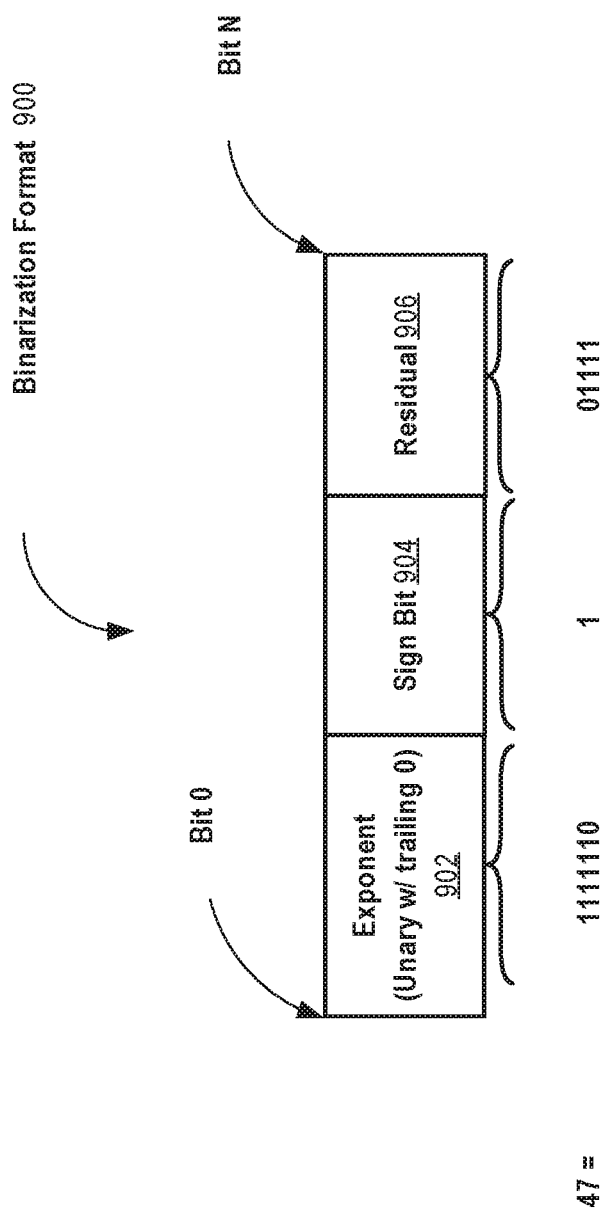
FIG. 9 depicts a binarization format for a quantized AC Coefficient or a DC error term per some implementations of the present invention.

Per some implementations of the present invention, each quantized AC coefficient 604, 608, 612 and the DC error term 614 are binarized in the block binarization format 600 with a Exp-Golomb Code that is extended to negative numbers by placing the sign bit directly after the unary length. FIG. 9 schematically depicts the binarization format 900 used for the quantized AC coefficients and the DC error term. The format 900 generally comprises a coefficient exponent 902, a sign bit 904, and a residual 906.

In some implementations, the coefficient exponent 902 is unary value representing the bit length of the value represented by the residual 906. The exponent 902 ends with a zero (0) terminal bit to signal the end of the unary value.

Next, a sign bit 904 is a binary value (zero or one) representing whether the value represented by the residual 906 is a positive number of a negative number. In some implementations, a one (1) bit value is used as the sign bit 904 for a positive number and a zero (0) bit value is used as the sign bit 904 for a negative number.

Finally, the residual 906 is a binary value representing the value of the quantized AC coefficient or the DC error term. The leading, most significant, binary digit of the residential 906 can be omitted, since the leading digit for all positive numbers will be one.

For example, per the format 900, the decimal number 47 may be represented as the following sequence of bits: 1111110 0 01111. In this example, the residual 906 omits the leading one (1) bit. Also in this example, the exponent 902 is six (6) in unary to represent the bit length of the complete binary value representation of 47 that comprises six (6) bits (e.g., 101111). As can be seen by this example, the exponent 902 counts the leading one (1) bit that is omitted from the residual 906.

Per some implementations, if the quantized AC coefficient or the DC error term is zero (0), the format 900 is not used. Instead, a zero (0) value is simply binarized in the block format 600 as a single zero (0) bit. The following table shows how the numbers 0 through 9 may be represented per format 900:

TABLE 1

Quantized AC Coefficient or DC Error Term Binarization Examples

| Decimal Value | Binary |
| --- | --- |
| 0 | 0 (bit) |
| 1 | 10 0 |
| 2 | 110 0 0 |
| 3 | 110 0 1 |
| 4 | 1110 0 00 |
| 5 | 1110 0 01 |
| 6 | 1110 0 10 |
| 7 | 1110 0 11 |
| 8 | 11110 0 000 |
| 9 | 11110 0 001 |

Bin Selection

At operation 308, a bin of the probability model is selected for each binary symbol to be encoded. Selection may vary depending on a variety of situational factors including whether the binary symbol binarizes a non-binary symbol from the 7 by 7 sub-block 504, the 7 by 1 edge row 506, the 1 by 7 sub-block 508, or the DC error term.

Bin Selection for the 7 by 7 Sub-Block

For the six binary symbols encoding the number of non-zero coefficients 602 in the 7 by 7 sub-block 504, the average of the number of non-zero coefficients 602 in the 7 by 7 sub-block 504 of the above and left blocks are used to select a bin index. This is mapped to a bin index from 0 to 9 inclusive by taking the $\log_{1.59}$ of the average. The symbol index being encoded combined with the value having been encoded so far are combined with the average non-zero index to give the full index of the bin. The additional information about the number decoded thus far and the symbol index is sufficient for the arithmetic decoder to adaptively assign the lowest possible probabilities to values above 49 non-zeros.

In this context, the term "combined" is used to mean the addition of two bin indices after one is scaled by the range of the other. For example, if index a ranges from 0 to 9 inclusive, and it is combined with another index b, the result is defined to be a+10·b.

As discussed above, the 7 by 7 coefficients 604 are encoded using a zig-zag scan that allows significantly fewer coefficients to be encoded than if they were encoded using raster-scan order, resulting in a better compression. For each of the 7 by 7 coefficients 604, the neighboring three quantized coefficients at the same zig-zag position in the 7 by 7 block 504 from the left, above, and above-left blocks are averaged with weights of 13, 13, and 6 respectively. This allows approximately double the importance of the adjoining blocks while adding to 32 and allowing a shift operation to complete the averaging. The weighted average is combined with $\log_{1.59}$ non-zeros remaining, the coefficient index, and how many symbols of the coefficient exponent were coded so far to produce a full bin index for each bit of the 7×7 quantized coefficient exponent 902. A bin is selected for the following sign bit 904 based only on the current component. Finally, the bin for the bits describing the residual 906 are encoded using a bin index specified by the component, the coefficient index from 0 to 48 inclusive, and the $\log_{1.59}$ nonzeros_remaining.

Bin Selection for the 7 by 1 Edge Row and the 1 by 7 Sub-Block

The 7 by 1 category use similar bin indices with a few key differences. First, the number of non-zeros 606 in the 7 by 1 edge row 506 only requires 3 binary symbols to describe, from zero to seven inclusive. The prior here is a combination of the component and the number of non-zeros 602 in the 7 by 7 sub-block 504 block divided by 7, and finally the farthest horizontal coordinate of a non-zero in the 7 by 7 sub-block 504 previously decoded.

For the actual quantized AC coefficients 608, the uth index left edge DCT coefficient where u∈[1,8), may be predicted by using the remainder of the entire row at that index as well as the entire matching row from the neighboring block to the left.

Per some implementations of the present invention, the entire uth row of 2-D DCT values is used to compute a corresponding coefficient of a 1-D DCT at the edge of the block. The same computation may be carried out to establish the 1-D DCT for the adjacent block to the left for its right-most (7th) pixel column. The uth index of the 1-D DCT of the 7th column of the known previous block may be assumed to be similar or equal to the uth index of the left-most row of the current block, since all 8 adjacent pixels tend to be similar. Thus, the final frequency space value $F_{0,u}$ can be estimated by subtracting the 1-D DCT of the 7th column of the adjoining neighbor block to the left from the known portion of the 1-D DCT of the left-most ($0^{th}$) column of the current block.

In detail, the basis elements of a DCT may be represented as:

$$C_{u,x} = c(u)\cos\left(\frac{(2x+1)u\pi}{16}\right) \text{ with } x, u \in [0, 8) \text{ and}$$

$$c(u) = \begin{cases} \frac{1}{2\sqrt{2}}, & u = 0 \\ \frac{1}{2}, & u \neq 0 \end{cases}$$

Thus, the cosine space values $F_{u,v}$ where u, v∈[0,8) may be defined from the pixel space values $p_{x,y}$ where x, y∈[0,8) may be represented as:

$$F_{u,v} = \Sigma_{y=0}^{7} C_{v,y} \Sigma_{x=0}^{7} P_{x,y} C_{u,x}$$

The DCT may be defined such that it is orthogonal. Hence:

$$\sum_{x=0}^{7} C_{u,x} C_{v,x} = \begin{cases} 0, & u \neq v \\ 1, & u = v \end{cases}$$

The above-equation defining the cosine space values $F_{u,v}$ may be represented differently by multiplying both sides of the equation by $\Sigma_{u=0}^{7} C_{v,y}$ to provide the following the relation:

$$\Sigma_{y=0}^{7} F_{u,y} C_{v,y} = \Sigma_{x=0}^{7} p_{x,y} C_{u,x}$$

The above-relation may be interpreted such that a single 1-D DCT coefficient of a column may be computed from the entire corresponding row of the 2-D DCT of the block. Similarly, a single 1-D DCT coefficient of a row may be computed from the corresponding column of the 2-D DCT of the block.

Because the 1-D DCT values of neighboring rows in neighboring sample blocks are likely to be similar, the uth edge value, $F_{u,0}$, can be represented by the following relation. In the following relation, $F_{u,v}$ represents the 2-D DCT coefficient at location u, v and $A_{u,v}$ represents the 2-D DCT coefficient at the location:

$$\Sigma_{y=0}^{7} F_{u,y} C_{0,y} = F_{u,0} C_{0,0} + \Sigma_{y=1}^{7} F_{u,y} C_{0,y} \approx \Sigma_{y=0}^{7} A_{u,y} C_{7,y}$$

When predicting $F_{u,0}$, the exponent of the following relation is fed as a bin index for the exponent.

$$F_{u,0} \approx \frac{\sum_{y=0}^{7} A_{u,y} C_{7,y} - \sum_{y=1}^{7} F_{u,y} C_{0,y}}{C_{0,0}}$$

That bin index of the exponential of the predicted value is combined with the component, the number of non-zeros remaining in the row, the coefficient index, and the index of the current unary bit of the exponent. The sign of the prediction can also be used as a bin index for the sign of $F_{u,0}$. The value is, in general, useful for predicting the first 7 bits of the residual values. Thus, for the first 7 bits, the bin index includes the 7 most significant bits of the predicted $F_{u,0}$ in addition to the component and the quantized coefficient's exponent.

Techniques analogous to those described above applied to the horizontal 7 by 1 column may also be applied to the vertical 1 by 7 row of quantized coefficients.

Bins for Predicting the DC Error Term

With all 63 of the AC coefficient known, the last element to predict is the DC coefficient. Instead of encoding the DC coefficient directly, a prediction is made. The delta between the prediction and the DC coefficient, known as the DC error term, is encoded instead. The DC error term may be encoded with bin indices corresponding to the certainty of the prediction.

The bin indices of the DC error term may be set as the combination of the $\log_2$ of the difference between the maximum and minimum prediction, as well as the $\log_2$ of the prediction farthest from the average. The sign of the prediction farthest from the average may also be sued as the sole bin index for the sign bit of the DC error term. Finally, the residual of the DC error term may use only the length of the difference between the maximum and minimum prediction as its bin index for accumulating probability counts.

Returning to FIG. 3, at operation 310, current probability estimates are computed from selected bins for binary symbols to be encoded. To compute a probability estimate from a selected bin for a binary symbol to be encoded, the current zero counter of the selected bin may be divided by the sum of the current zero counter and the current one counter. Alternatively, the current one counter of the selected bin may be divided the sum. In either case, the probability estimate represents the probability that the binary symbol to be encoded is a zero symbol or a one symbol and one minus the probability estimate represents the probability that the binary symbol to be encoded is the other of the zero symbol or the one symbol. The probability estimate may be used to identify a proportional sub-interval of a current interval when arithmetically encoding the binary symbol.

At operation 312, the binary symbols are arithmetically encoded based on the current probability estimates of the selected bins. A probability estimate may supply the probability that the current binary symbol is a "0" or a "1". From the probability estimate, the probability that the current binary symbol is the other of the "0" or the "1" can be determined. These two probabilities estimates may be used to determine the two sub-ranges corresponding to the "0" and "1" binary symbols that the arithmetic coder uses to encode the current binary symbol.

Basically, arithmetically encoding a binary symbol at operation 312 may start from a current interval. For the first binary symbol being encoded, the current interval is initialized to [0, 1). The current interval is then subdivided into two sub-intervals, one sub-interval for the "one" symbol and the other sub-interval for the "zero" symbol. The subdivision of the current interval is based on the probability estimate computed for binary symbol being encoded. Specifically, the size of the sub-interval for the "one" symbol and the size of the sub-interval for the "zero" symbol is proportional to the estimated the probability that that symbol is the binary symbol being encoded. The subinterval corresponding the binary symbol being encoded is selected and that subinterval becomes the new current interval for the next binary symbol to encode, if there is one. As an alternative to computing both subintervals of the current interval based on the probability estimate, only the subinterval corresponding to the binary symbol being encoded need be computed. The final subinterval corresponding to the last binary symbol encoded is then represented with enough bits sufficient to distinguish it from all other possible final intervals.

At operation 314, the selected bins of the probability model are updated. For example, if a bin is selected for a given binary symbol and the value of the binary symbol is "0", then the zero counter of the selected bin is incremented. Thus, the next time the bin is selected, the probability of a "0" is slightly higher.

DC Error Term

In accordance with some implementations of the present invention, a prediction of the DC coefficient is computed and the difference (DC error term) between the actual DC coefficient and the prediction is encoded. By encoding the DC error term in place of the actual DC coefficient, further compression is achieved. The actual DC coefficient can be recovered by during decompression by generating the prediction again and combining it with the DC error term encoded in the further compressed image.

A goal is to generate an accurate prediction that minimizes the numerical difference between the prediction and the actual DC coefficient. In general, the smaller the difference (i.e., the more accurate the prediction), then the fewer number of bits required to encode the difference in the further compressed image. On average, the encoding of the DC coefficients can account for as much as approximately 8% of the total data size of an original compressed image. Thus, generating predictions that are more accurate on average than the predictions of an original entropy encoder can result in significant additional compression.

In general, two different prediction methodologies are provided. A first prediction methodology is referred to herein as a "local brightness prediction." The second prediction methodology is referred to herein as a "local gradient prediction." Both methodologies are based generally on samples in the block of samples corresponding to the target quantized DCT block for a component, neighboring samples in the block of samples corresponding to the quantized DCT block above the target quantized DCT block for the same component, and neighboring samples in the block of samples corresponding to the quantized DCT block left of the target quantized DCT block for the same component.

If the above block of samples is not available because the target block of samples corresponds to the first row of blocks of the component, then the prediction may be based on just samples in the target sample block and the left sample block. If the left sample block is not available because the target sample block corresponds to the first column of blocks of the component, then the prediction may be based on just samples in the target sample block and samples in the above sample block. If both the above block and the left block are not available because the target sample block corresponds to the top-left block of the component, then, in some implementations, no prediction is generated.

In some implementations, if one or both above and left sample blocks are not available, then a different prediction methodology is used, or no prediction is made. More generally, the local brightness prediction methodology and the local gradient prediction methodology described herein may be used in place of, or in conjunction with, other quantized DC coefficient prediction methodologies. Further, different prediction methodologies may be used for different target quantized DCT blocks. For example, an additional process may determine that the local brightness prediction methodology or another methodology is more appropriate (e.g., is estimated to make a more accurate prediction) than the local gradient prediction methodology for a given target quantized DCT block and that prediction methodology may be used to generate the prediction for the given block instead of using the local gradient prediction methodology for the given block.

In some implementations, multiple prediction methodologies are used for a given block to generate multiple predictions and the prediction estimated to be the most accurate is used for the given block. For example, the local brightness and the local gradient prediction methodologies may both be used for a given block and the prediction estimated to be most accurate may be used as the prediction for the given block.

The terms "above" and "left" are defined by the order in which the quantized DCT blocks for a component are processed by the DCT-based encoder. In general, the processing order is left to right and top to bottom within the component where the four sides of the component are designated as top, bottom, left, and right with bottom opposite top and left opposite right. Because of the processing order, any quantized DCT blocks of a component "above" (i.e., nearer to the top of the component) and to the left of a target quantized DCT block of the component are processed before the target quantized DCT block. Thus, information determined by processing the above and left quantized DCT blocks is available when the target quantized DCT block is processed, assuming the left and above blocks are available for the target block.

Local Brightness Prediction Methodology

Figure 10:
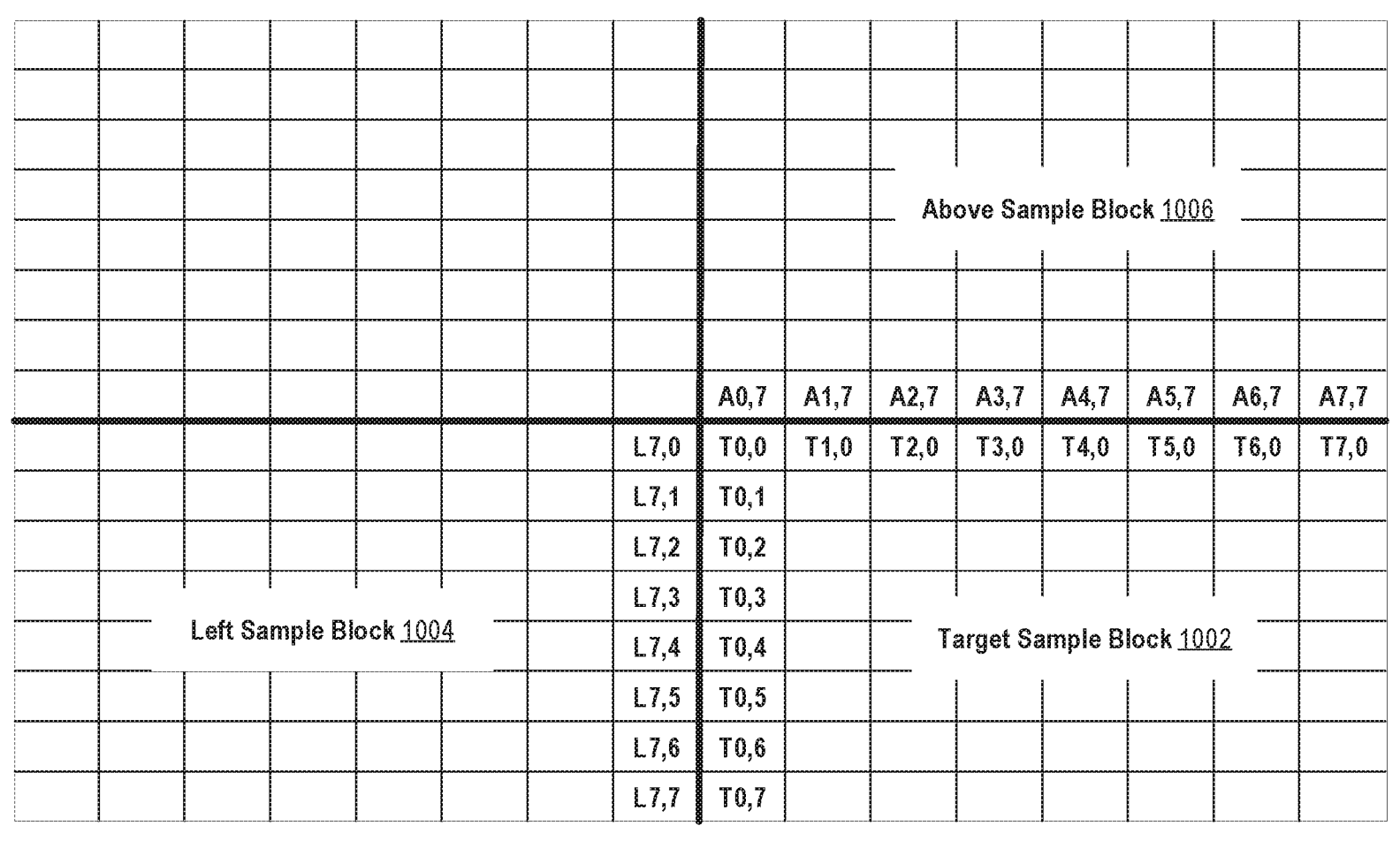

The local brightness prediction methodology computes as the prediction the overall brightness that minimizes the differences between all sixteen pairs of samples at the edges between the target block of samples and both the left and above blocks of samples. This is illustrated in FIG. 10. As shown, a target 8 by 8 block of samples 1002 has a leftmost column of samples comprising samples T0,0 through T0,7. Here, the letter "T" is used to refer to a sample in the target block of samples 1002 and "X, Y" are integers used to refer to the sample in X-th column and the Y-th row of the target block 1002. Target block 1002 also has a top row of samples comprising samples T0,0 through T7,0. The remaining cells of target block 1002 also have samples but are not designated as such in FIG. 10 for purposes of providing a clear example. Similarly, left block 1004 has a rightmost column of samples comprising samples L7,0 through L7,7. Here, the letter "L" is used to refer to a sample in the left block of samples 1004. Similarly, above block 1006 has a bottommost row of samples comprising samples A0,7 through A7,7. Here, the letter "A" is used to refer to a sample in the above block of samples 1006. Like target block 1002, left block 1004 and above block 1006 also have samples in their remaining cells that are not explicitly designated in FIG. 10.

Figure 11:
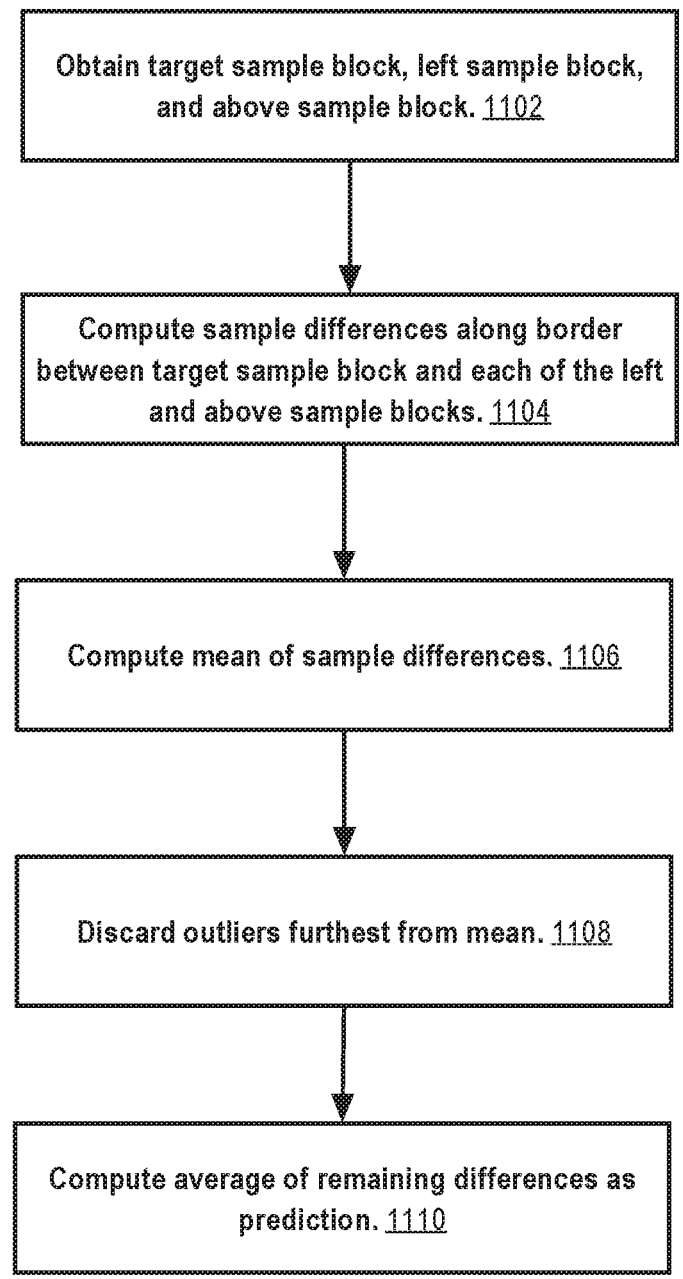
FIG. 11 is a flowchart of the local brightness prediction methodology per some implementations of the present invention.

Turning now to FIG. 11, it is a flowchart 1100 of the high-level operations of the local brightness prediction methodology for generating a prediction for the quantized DC coefficient of a target quantized DCT block for a component per some implementations of the present invention. Generally, operations 1102, 1104, 1106, 1108, and 1110 may be performed for each target quantized DCT block for a component for which the above quantized DCT block and the left quantized DCT block for the component are available in the processing order. To provide a clear example, the operations of the methodology are described below regarding FIG. 10. The methodology may be implemented in software, hardware, or a combination of software and hardware per the requirements of the implementation at hand.

At operation 1102, the target sample block 1002, the left sample block 1004, and the above sample block 1006 are obtained. The target sample block 1002 may be obtained by applying the inverse DCT to a dequantized DCT block corresponding to the target quantized DCT block where the DC coefficient is set to a predetermined dummy value in the corresponding dequantized DCT block to which the inverse DCT is applied. In some implementations, the predetermined dummy value for the DC coefficient is zero (0). The output of the inverse DCT with this input is the target sample block 1002. The corresponding dequantized DCT block may be obtained from the target quantized DCT block by dequantizing the quantized DCT coefficients of the target quantized DCT block. The dequantization may be based on the same or equivalent quantization table used to originally quantize the target DCT block. The DC coefficient is set to a predetermined dummy value in the corresponding dequantized DCT block input to the inverse DCT to represent the prediction being made and because access to the actual quantized DC coefficient for the target quantized DCT block is not available to the inverse coefficient pre-processor during decoding or decompression.

In some implementations, the samples output by the inverse DCT are first inverse level shifted to produce the target sample block 1002 such that each sample in the target sample block 1002 is a N-bit value representing an unsigned integer. Here, N may be 2, 4, 8, 10, or 12, for example.

The left sample block 1004 and the above sample block 1006 may be similarly obtained by applying the inverse DCT to the corresponding dequantized DCT blocks. However, for the left and above sample blocks 1004 and 1006, the dequantized DC coefficients are retained in the corresponding dequantized DCT blocks input to the inverse DCT. These dequantized DC coefficients are not set to a dummy value as is done with the target quantized DCT block as these coefficients are available to the inverse coefficient pre-processor by the time the target quantized DCT block is processed in the processing order. Like the samples for the target block 1002, samples for the left and above blocks 1004 and 1006 output by the inverse DCT may also first be inverse level shifted.

At operation 1104, sample differences are computed along the edges between the target sample block 1002 and each of the left sample block 1004 and the above sample block 1006 for a total of sixteen (16) sample differences. Specifically, the following sixteen (16) sample differences may be computed in some implementations:

TABLE 2

Sample Differences for Local Brightness Prediction

| Left Border | Above Border |
|---|---|
| ABS(T0,0 - L7,0) = DIFF1 | ABS(T0,0 - A0,7) = DIFF9 |
| ABS(T0,1 - L7,1) = DIFF2 | ABS(T1,0 - A1,7) = DIFF10 |
| ABS(T0,2 - L7,2) = DIFF3 | ABS(T2,0 - A2,7) = DIFF11 |
| ABS(T0,3 - L7,3) = DIFF4 | ABS(T3,0 - A3,7) = DIFF12 |
| ABS(T0,4 - L7,4) = DIFF5 | ABS(T4,0 - A4,7) = DIFF13 |
| ABS(T0,5 - L7,5) = DIFF6 | ABS(T5,0 - A5,7) = DIFF14 |
| ABS(T0,6 - L7,6) = DIFF7 | ABS(T6,0 - A6,7) = DIFF15 |
| ABS(T0,7 - L7,7) = DIFF8 | ABS(T7,7 - A7,7) = DIFF16 |

The ABS in the above table refers to the absolute value of the difference.

At operation 1106, the mean of the sixteen (16) differences is computed.

At operation 1108, one or more of the sixteen (16) differences that are furthest from the mean computed at operation 1106 are discarded for purposes of making the prediction. In some implementations, a fixed number of outliers are identified. For example, of the sixteen (16) differences, the eight (8) that are furthest from the mean may be identified as outliers and discarded.

At operation 1110, the average of the remaining differences is computed after the outliers are discarded at operation 1108. The computed average is used as the prediction of the quantized DC coefficient of the target quantized DCT block.

In a variation on the local brightness prediction approach, the average of each of the sixteen (16) pairs of samples along the left and top borders is computed. For example, one of the sixteen averages would be the average of sample pair {T7,3}, {T0,3} along the left border. The median of the sixteen averages is then computed and the average of the eight averages closest to the median is computed and used as the prediction, ignoring the eight averages farther from the median.

The local brightness prediction approach or its variation can make a more accurate prediction when the image has abrupt edges at the borders between the target sample block 1002 and the left sample block 1004 and the above sample block 1006. However, many images have smooth gradients that cross sample block edge boundaries. For example, a photographic image of a sunset may have smooth gradients that cross sample block edge boundaries in the image where the sky fades from blue to orange at the horizon. To make a more accurate prediction for images having smooth gradients, the local gradient prediction approach may be used.

Local Gradient Prediction Methodology

Figure 12A:
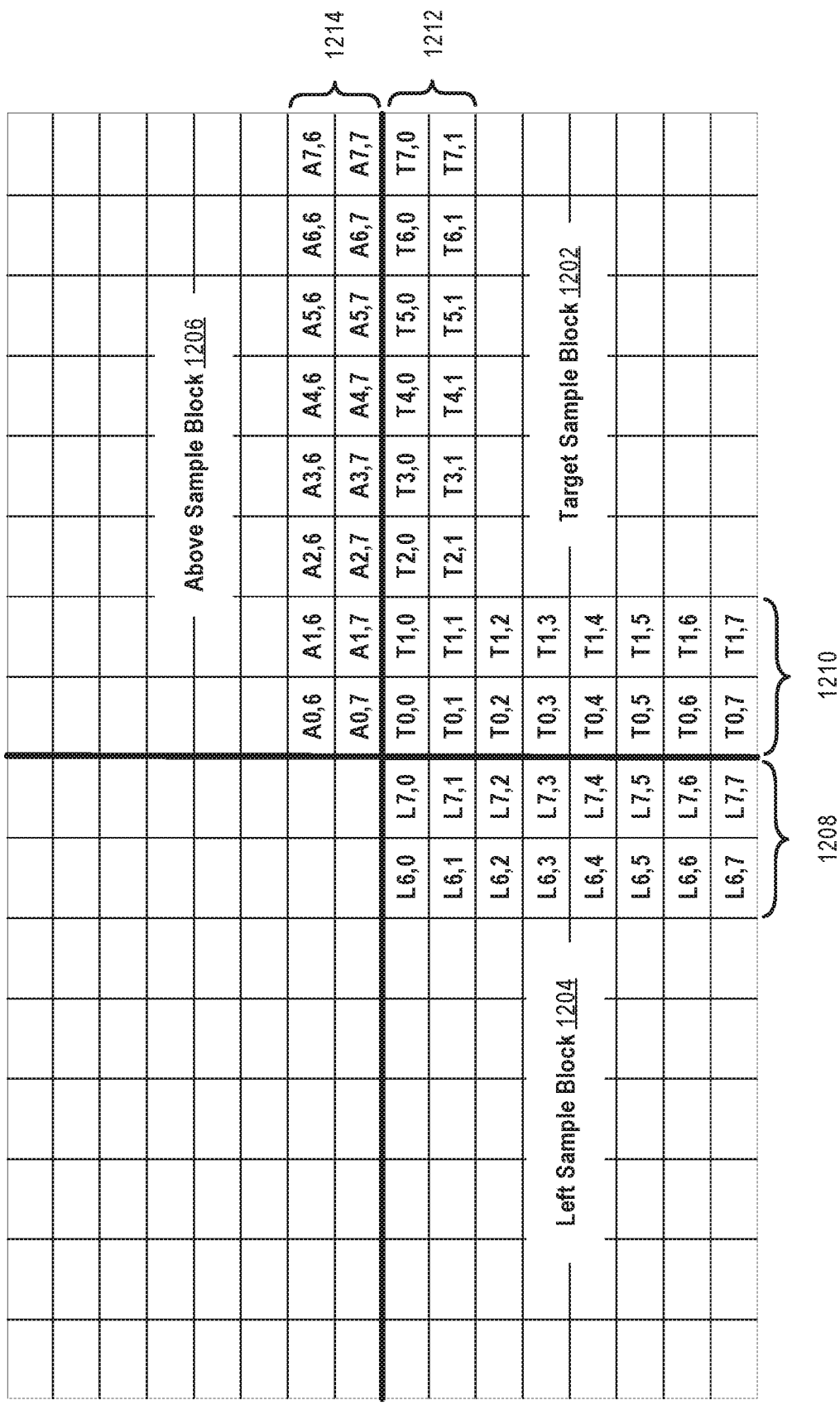
FIG. 12A depicts the samples involved in a local gradient prediction methodology per some implementations of the present invention.

The local gradient prediction methodology takes advantage of the independence of the difference between a pair of neighboring samples (i.e., the gradient) in a block of samples being independent of the brightness of the sample block. As such, gradients in the target sample block can be used to compute a prediction of the quantized DC coefficient of the target quantized DCT block. Per some implementations, bordering gradients from the left sample block and the above sample block are also used to compute the prediction. This is illustrated in FIG. 12A. As shown, a target 8×8 block 1202 of samples has two left-most vertical columns 1210 and two top-most horizontal rows 1212. The left 8×8 block 1204 of samples has two right-most vertical columns 1208 bordering vertical columns 1210 of the target block 1202. The above 8×8 block 1206 of samples has two bottom-most horizontal rows 1214 bordering horizontal rows 1212 of the target block 1202.

In general, the local gradient prediction methodology computes the differences between the left block's 1204 horizontal gradients and the target block's 1202 corresponding horizontal gradients and computes the differences between above block's 1206 vertical gradients and the target block's 1204 corresponding vertical gradients. Here, the left block's 1204 horizontal gradients are computed as the differences between samples in the rightmost columns 1208 of the left block 1204, the above block's 1206 vertical gradients are computed as the differences between samples in the bottommost rows 1214 of the above block 1206, the target block's 1202 horizontal gradients are computed as the differences between samples in the leftmost columns 1210 of the target block 1202, and the target block's 1202 vertical gradients are computed as the differences between samples in the topmost rows 1212 of the target block 1202.

Figure 12B:
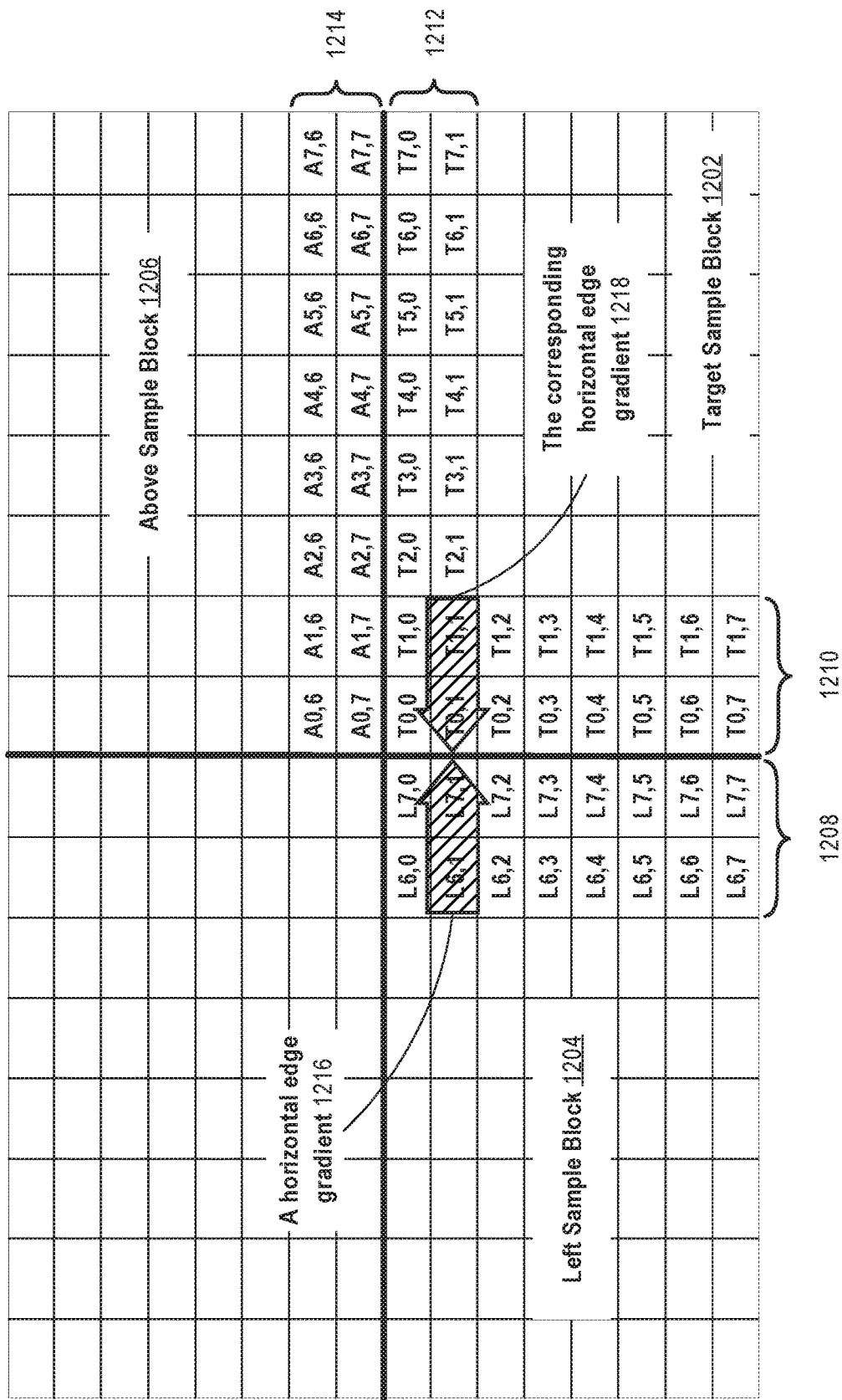
FIG. 12B depicts samples involved in a horizontal edge gradient per some implementations of the present invention.
Figure 12C:
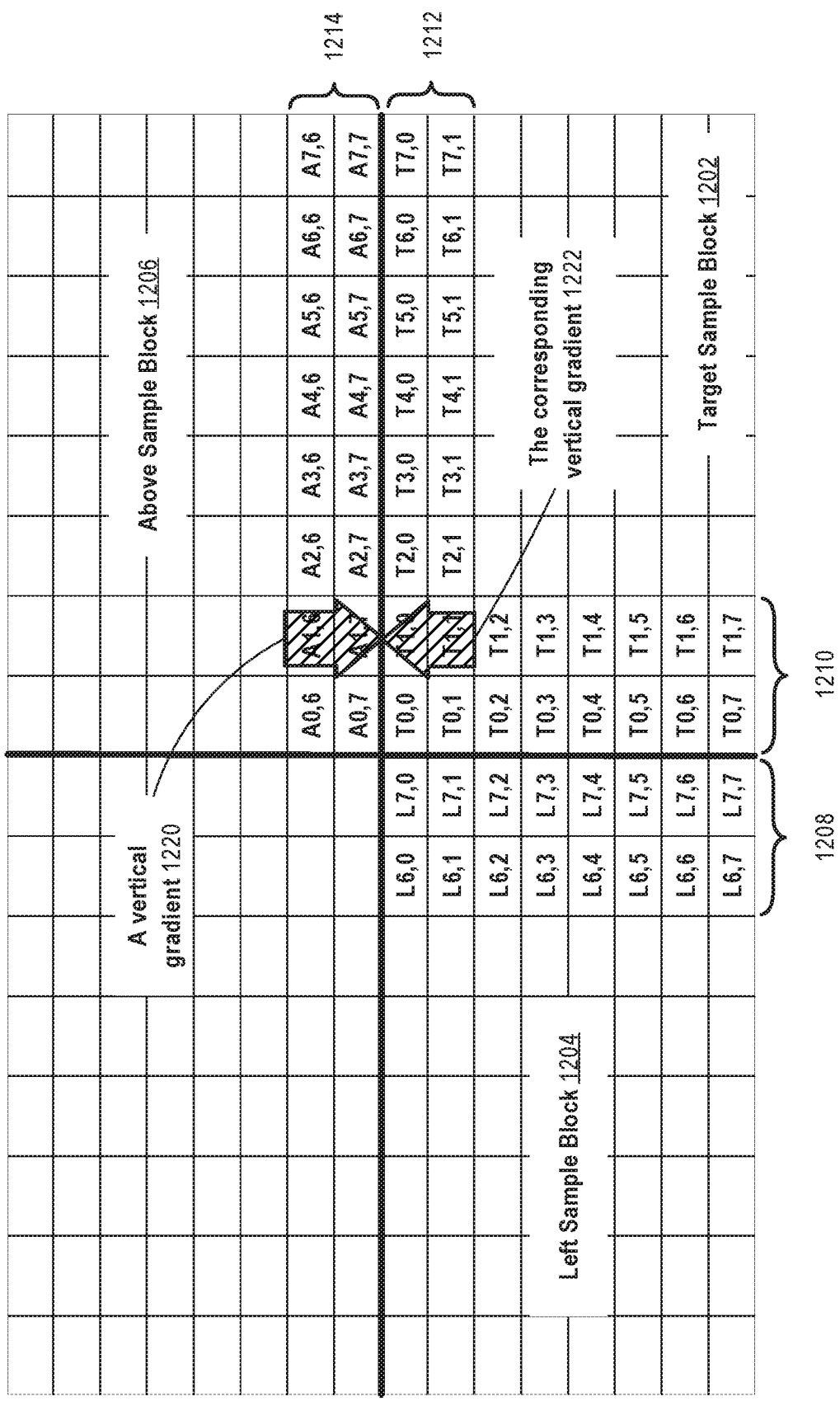
FIG. 12C depicts samples involved in a vertical edge gradient per some implementations of the present invention.

Each difference between corresponding gradients is taken as a gradient difference. The gradient difference is a positive or a negative value depending on the directions and magnitude of the corresponding gradients toward the edge or zero if the direction and magnitudes are equal. Thus, corresponding gradients having the same or similar direction and magnitude tend to cancel each other out. However, images tend to have smooth gradients. A positive or negative (i.e., non-zero) value of the gradient difference reflects this. This is illustrated in FIG. 12B. The shaded arrow 1216 represents a horizontal gradient in the left block 1204 toward the edge between the left block 1204 and the target block 1202 and the shaded arrow 1218 represents the corresponding horizontal gradient in the target block 1202 toward the edge between the left block 1204 and the target block 1202. Here, the horizontal gradient 1216 may be computed as the difference toward the edge between the left block 1204 and the target block 1202 between samples L6,1 and L7,1 (e.g., L6,1 minus L7,1) and the corresponding horizontal gradient 1218 may be computed as the difference toward the edge between samples T1,1 and T0,1 (e.g., T1,1 minus T,01). In the FIG. 12C, shaded arrow 1220 represent a vertical gradient in the above block 1206 toward the edge between the above block 1206 and the target block 1202 and shaded arrow 1222 represents the corresponding vertical gradient in the target block 1202 toward the edge.

If a gradient (e.g., 1216) is a negative value, then the component is increasing in intensity toward the edge in the samples differenced to compute the gradient. Conversely, if a gradient is a positive value, then the component is decreasing in intensity toward the edge in the differenced samples. If a gradient is zero, then the component has a constant intensity toward the edge in the differenced samples.

As mentioned, the difference between a gradient and its opposing gradient may be taken as a gradient difference. In some implementations, the actual local gradient prediction of the quantized DC coefficient is computed as the average of all sixteen (16) gradient differences. The local gradient prediction is on average more accurate than the prediction generated by the local brightness approach because on average images have more smooth gradients crossing sample block boundaries than abrupt edges at the boundaries.

Figure 13:
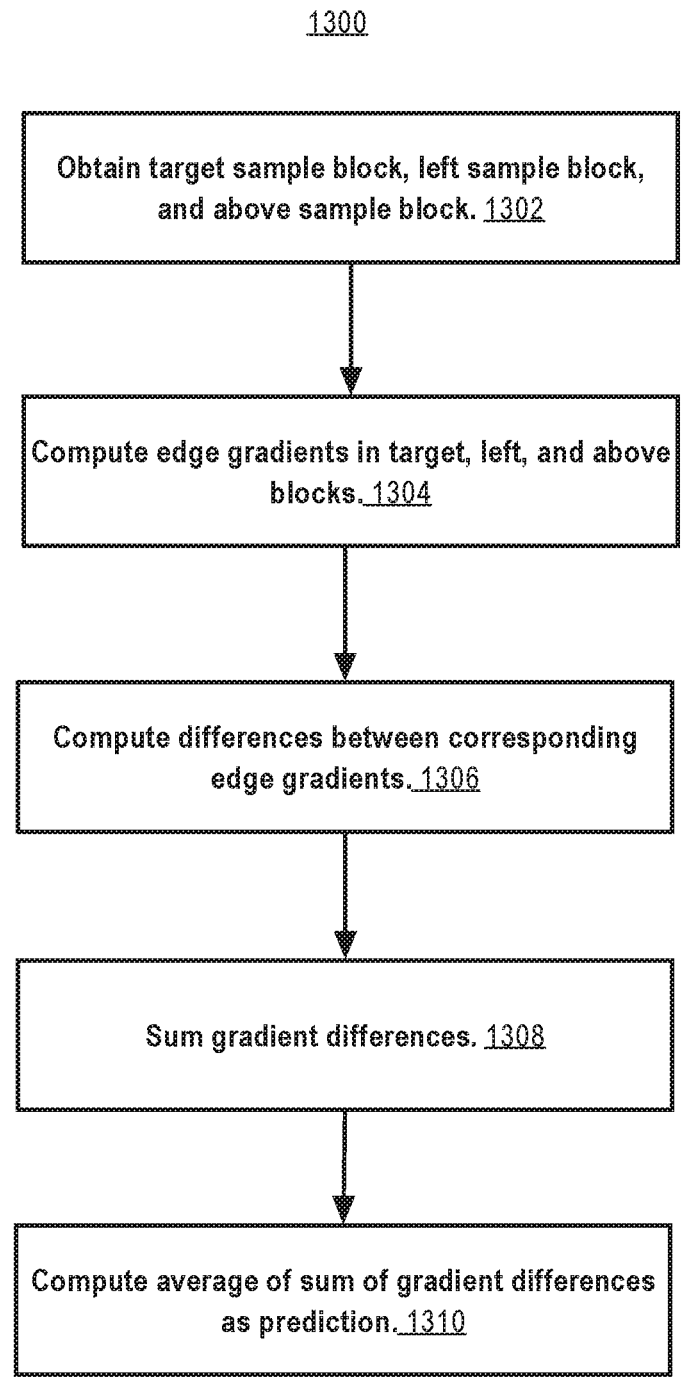
FIG. 13 is a flowchart of the local gradient prediction methodology per some implementations of the present invention.

Turning now to FIG. 13, it is a flowchart 1300 of the high-level operations of the local gradient prediction methodology for generating a prediction for the quantized DC coefficient of a target quantized DCT block for a component per some implementations of the present invention. Generally, operations 1302, 1304, 1306, 1308, and 1310 may be performed for each target quantized DCT block for a component for which the above quantized DCT block and the left quantized DCT block for the component are available in the processing order. To provide a clear example, the operations of the methodology are described below regarding FIG. 12A. The methodology may be implemented by the coefficient pre-processor and the inverse coefficient pre-processor and may be implemented in software, hardware, or a combination of software and hardware per the requirements of the implementation at hand.

At operation 1302, the target sample block 1202, the left sample block 1204, and the above sample block 1206 are obtained. These blocks may be obtained in a manner like the way blocks 1002, 1004, and 1006 are obtained at operation 1102 of the local brightness prediction methodology. The inverse DCT may be applied the corresponding dequantized DCT blocks. Like at operation 1102, the DC coefficient of the dequantized DCT block corresponding to the target block 1202 is set to a dummy value, e.g., zero (0), before the inverse DCT is applied to the dequantized DCT block with the dummy value for the DC coefficient. Also like operation 1102, the DC coefficients of the dequantized DCT blocks corresponding to the left 1204 and above 1206 blocks are not replaced before undergoing the inverse DCT.

At operation 1304, the thirty-two (32) edge gradients are computed as specified in the following table. Each gradient is directional. Specifically, toward the edge between the left block 1204 and the target block 1202 in the case of the horizontal gradients and toward the edge between the above block 1206 and the target block 1202 in the case of the vertical gradients.

TABLE 3

Edge Gradients

| Left Horizontal Edge Gradients | Right Horizontal Edge Gradients | Top Vertical Edge Gradients | Bottom Vertical Edge Gradients |
|---|---|---|---|
| L6,0 - L7,0 = G0 | T1,0 - T0,0 = G8 | A0,6 - A0,7 = G16 | T0,1 - T0,0 = G24 |
| L6,1 - L7,1 = G1 | T1,1 - T0,1 = G9 | A1,6 - A1,7 = G17 | T1,1 - T1,0 = G25 |
| L6,2 - L7,2 = G2 | T1,2 - T0,2 = G10 | A2,6 - A2,7 = G18 | T2,1 - T2,0 = G26 |
| L6,3 - L7,3 = G3 | T1,3 - T0,3 = G11 | A3,6 - A3,7 = G19 | T3,1 - T3,0 = G27 |
| L6,4 - L7,4 = G4 | T1,4 - T0,4 = G12 | A4,6 - A4,7 = G20 | T4,1 - T4,0 = G28 |
| L6,5 - L7,5 = G5 | T1,5 - T0,5 = G13 | A5,6 - A5,7 = G21 | T5,1 - T5,0 = G29 |
| L6,6 - L7,6 = G6 | T1,6 - T0,6 = G14 | A6,6 - A6,7 = G22 | T6,1 - T6,0 = G30 |
| L6,7 - L7,7 = G7 | T1,7 - T0,7 = G15 | A7,6 - A7,7 = G23 | T7,1 - T7,0 = G31 |

Each of the gradients in the above table is zero or a positive or negative value depending on whether the gradient increases toward the edge (a negative value) or decreases toward the edge (a positive value) or remains constant (zero).

At operation 1306, the differences between corresponding gradients are computed as sixteen (16) gradient differences as specified in the following table.

TABLE 4

Gradient Differences

| Horizontal Gradient Differences | Vertical Gradient Differences |
|---|---|
| GDIFF0 = G0-G8 | GDIFF8 = G16-G24 |
| GDIFF1 = G1-G9 | GDIFF9 = G17-G25 |
| GDIFF2 = G2-G10 | GDIFF10 = G18-G26 |
| GDIFF3 = G3-G11 | GDIFF11 = G19-G27 |
| GDIFF4 = G4-G12 | GDIFF12 = G20-G28 |
| GDIFF5 = G5-G13 | GDIFF13 = G21-G29 |
| GDIFF6 = G6-G14 | GDIFF14 = G22-G30 |
| GDIFF7 = G7-G15 | GDIFF15 = G23-G31 |

In the above table, the horizontal and vertical gradients are computed as part of operation 1304. Each gradient difference is a positive or a negative value if the corresponding gradients do not equally oppose each other and zero if they do.

At operation 1308, the sum of the sixteen (16) gradient differences is computed.

At operation 1310, the average of the sum computed at operation 1308 is computed. The computed average may be used as the prediction of the quantized DC coefficient for the target quantized DCT block.

While in some implementations such as those discussed above a prediction is computed for a quantized DC coefficient as opposed to the corresponding dequantized DC coefficient, the prediction is computed for the dequantized DC coefficient as opposed to the corresponding quantized DC coefficient in some implementations. Note that in both cases the prediction is computed the same way based on dequantized DCT coefficients that are transformed to samples by the inverse DCT. In the case the prediction is for the dequantized DC coefficient, the actual dequantized DC coefficient can be recovered by the inverse coefficient pre-processor by combing its own generated prediction with the delta encoded in the further compressed image. In either case, the prediction is sufficiently accurate because of the small quantization step size typically used to quantize DC coefficients.

Basic Computing Device

Figure 14:
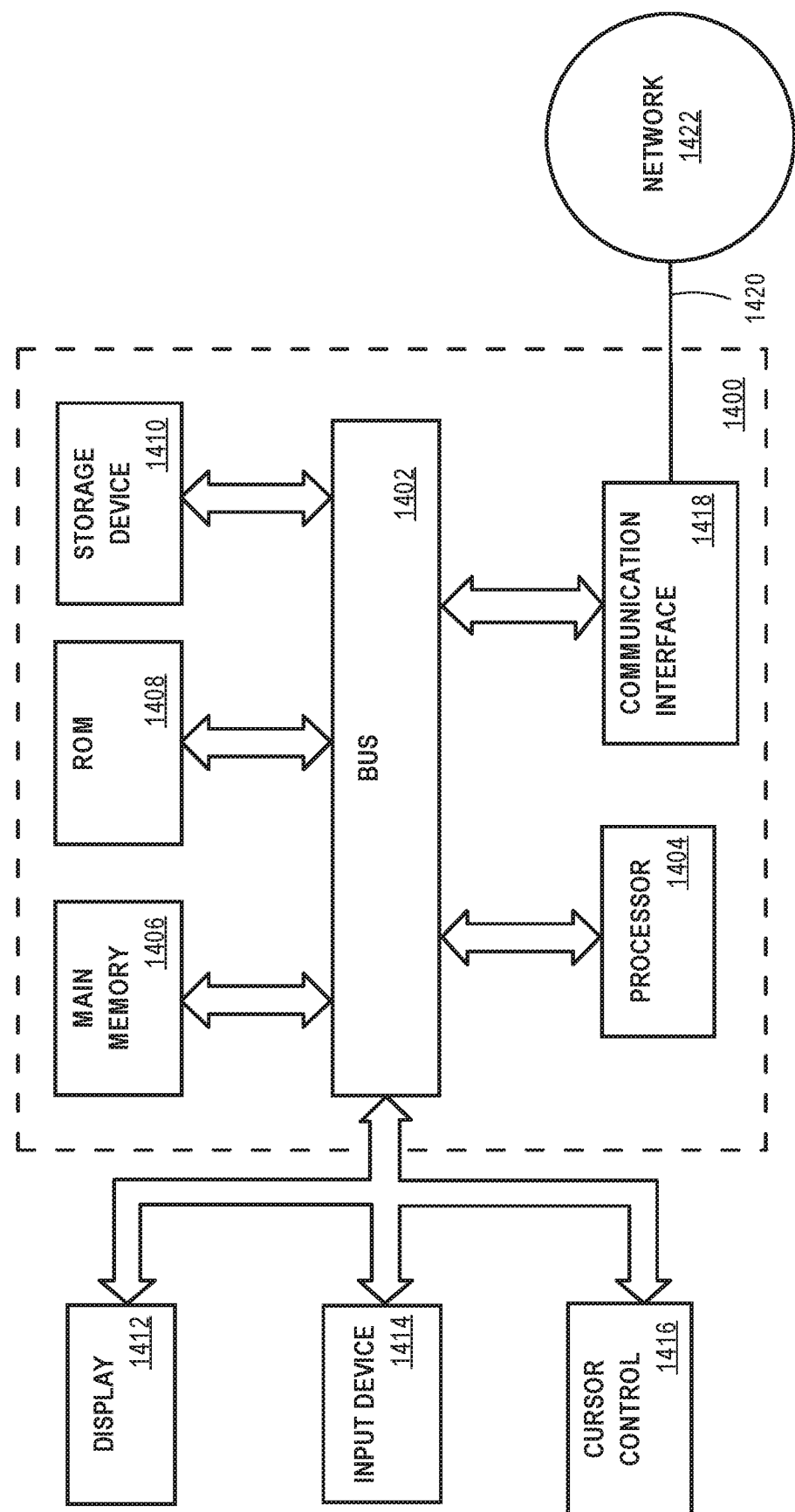
FIG. 14 is a block diagram that illustrates a basic computing device in which the implementations of the present invention may be embodied.

Referring now to FIG. 14, it is a block diagram that illustrates a basic computing device 1400 in which the example embodiment(s) of the present invention may be embodied. Computing device 1400 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1400 may include a bus 1402 or other communication mechanism for addressing main memory 1406 and for transferring data between and among the various components of device 1400.

Computing device 1400 may also include one or more hardware processors 1404 coupled with bus 1402 for processing information. A hardware processor 1404 may be a general-purpose microprocessor, a system on a chip (SoC), or another processor.

Main memory 1406, such as a random-access memory (RAM) or other dynamic storage device, also may be coupled to bus 1402 for storing information and software instructions to be executed by processor(s) 1404. Main memory 1406 also may be used for storing temporary variables or other intermediate information during execution of software instructions to be executed by processor(s) 1404.

Software instructions, when stored in storage media accessible to processor(s) 1404, render computing device 1400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1400 also may include read only memory (ROM) 1408 or other static storage device coupled to bus 1402 for storing static information and software instructions for processor(s) 1404.

One or more mass storage devices 1410 may be coupled to bus 1402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1410 (e.g., the main hard disk for the device) stores a body of program and data for directing operation of the computing device, including an operating system, user application programs, driver and other support files, as well as other data files of all sorts.

Computing device 1400 may be coupled via bus 1402 to display 1412, such as a liquid crystal display (LCD) or other electronic visual display, for displaying information to a computer user. In some configurations, a touch sensitive surface incorporating touch detection technology (e.g., resistive, capacitive, etc.) may be overlaid on display 1412 to form a touch sensitive display for communicating touch gesture (e.g., finger or stylus) input to processor(s) 1404.

An input device 1414, including alphanumeric and other keys, may be coupled to bus 1402 for communicating information and command selections to processor 1404. In addition to or instead of alphanumeric and other keys, input device 1414 may include one or more physical buttons or switches such as, for example, a power (on/off) button, a "home" button, volume control buttons, or the like.

Another type of user input device may be a cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

While in some configurations, such as the configuration depicted in FIG. 14, one or more of display 1412, input device 1414, and cursor control 1416 are external components (i.e., peripheral devices) of computing device 1400, some or all of display 1412, input device 1414, and cursor control 1416 are integrated as part of the form factor of computing device 1400 in other configurations.

Functions of the disclosed systems, methods, and modules may be performed by computing device 1400 in response to processor(s) 1404 executing one or more programs of software instructions contained in main memory 1406. Such software instructions may be read into main memory 1406 from another storage medium, such as storage device(s) 1410. Execution of the software instructions contained in main memory 1406 cause processor(s) 1404 to perform the functions of the example embodiment(s).

While functions and operations of the example embodiment(s) may be implemented entirely with software instructions, hard-wired or programmable circuitry of computing device 1400 (e.g., an ASIC, a FPGA, or the like) may be used in other embodiments in place of or in combination with software instructions to perform the functions, per the requirements of the implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random-access memory (NVRAM), flash memory, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more software instructions to processor(s) 1404 for execution. For example, the software instructions may initially be carried on a magnetic disk or solid-state drive of a remote computer. The remote computer can load the software instructions into its dynamic memory and send the software instructions over a telephone line using a modem. A modem local to computing device 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor(s) 1404 retrieves and executes the software instructions. The software instructions received by main memory 1406 may optionally be stored on storage device(s) 1410 either before or after execution by processor(s) 1404.

Computing device 1400 also may include one or more communication interface(s) 1418 coupled to bus 1402. A communication interface 1418 provides a two-way data communication coupling to a wired or wireless network link 1420 that is connected to a local network 1422 (e.g., Ethernet network, Wireless Local Area Network, cellular phone network, Bluetooth wireless network, or the like). Communication interface 1418 sends and receives electrical, electromagnetic, or optical signals that carry digital data streams representing various types of information. For example, communication interface 1418 may be a wired network interface card, a wireless network interface card with an integrated radio antenna, or a modem (e.g., ISDN, DSL, or cable modem).

Network link(s) 1420 typically provide data communication through one or more networks to other data devices. For example, a network link 1420 may provide a connection through a local network 1422 to a host computer 1424 or to data equipment operated by an Internet Service Provider (ISP) 1426. ISP 1426 in turn provides data communication services through the world-wide packet data communication network now commonly referred to as the "Internet" 1428. Local network(s) 1422 and Internet 1428 use electrical, electromagnetic or optical signals that carry digital data streams. The signals through the various networks and the signals on network link(s) 1420 and through communication interface(s) 1418, which carry the digital data to and from computing device 1400, are example forms of transmission media.

Computing device 1400 can send messages and receive data, including program code, through the network(s), network link(s) 1420 and communication interface(s) 1418. In the Internet example, a server 1430 might transmit a requested code for an application program through Internet 1428, ISP 1426, local network(s) 1422 and communication interface(s) 1418.

The received code may be executed by processor 1404 as it is received, and/or stored in storage device 1410, or other non-volatile storage for later execution.

Basic Software System

Figure 15:
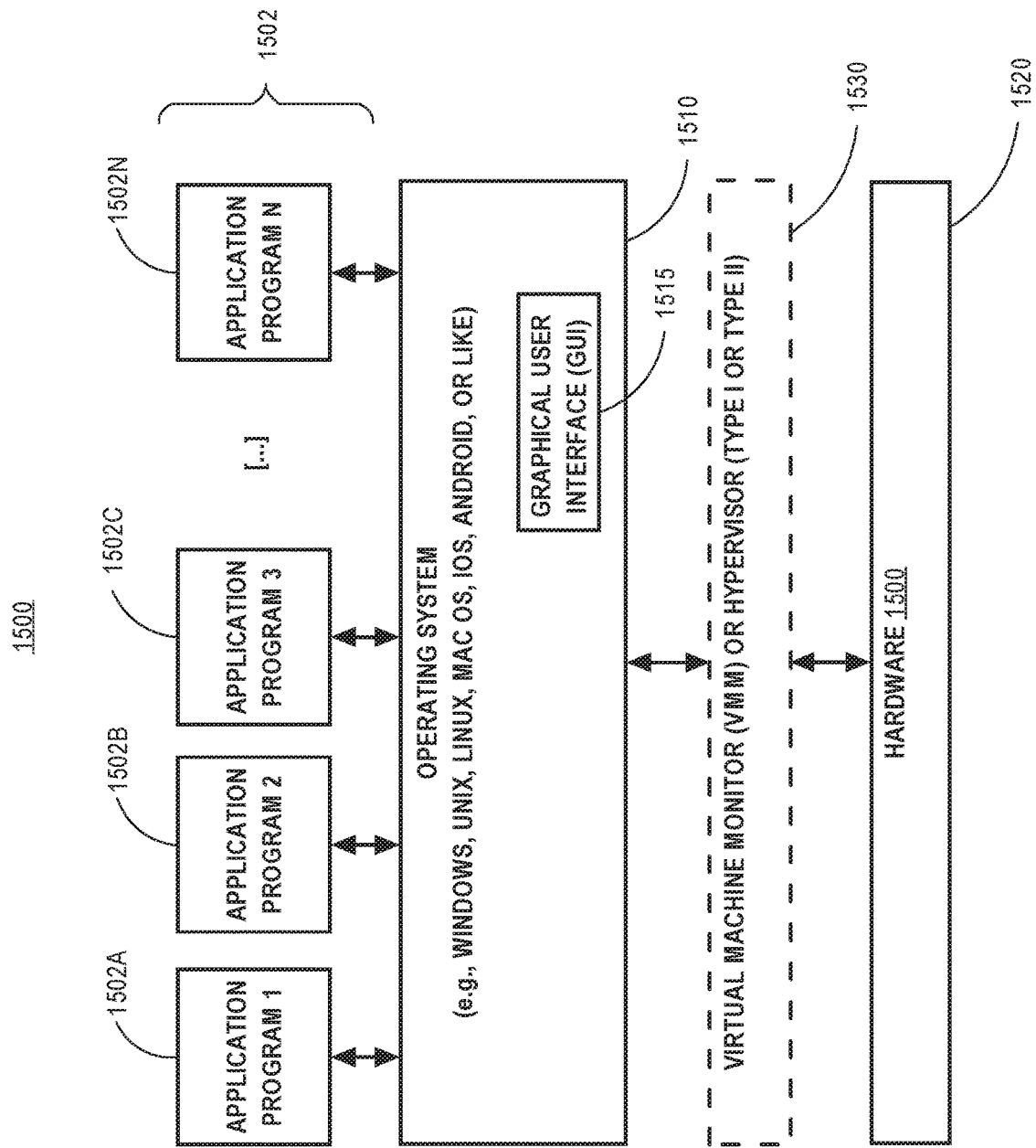
FIG. 15 is a block diagram of a basic software system that may be employed for controlling the operation of the computing device.

FIG. 15 is a block diagram of a basic software system 1500 that may be employed for controlling the operation of computing device 1400. Software system 1500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1500 is provided for directing the operation of computing device 1400. Software system 1500, which may be stored in system memory (RAM) 1406 and on fixed storage (e.g., hard disk or flash memory) 1410, includes a kernel or operating system (OS) 1510.

The OS 1510 manages low-level aspects of computer operation, including managing execution of processes, memory allocation, file input and output (I/O), and device I/O. One or more application programs, represented as 1502A, 1502B, 1502C . . . 1502N, may be "loaded" (e.g., transferred from fixed storage 1410 into memory 1406) for execution by the system 1500. The applications or other software intended for use on device 1500 may also be stored as a set of downloadable computer-executable instructions, for example, for downloading and installation from an Internet location (e.g., a Web server, an app store, or other online service).

Software system 1500 includes a graphical user interface (GUI) 1515, for receiving user commands and data in a graphical (e.g., "point-and-click" or "touch gesture") fashion. These inputs, in turn, may be acted upon by the system 1500 in accordance with instructions from operating system 1510 and/or application(s) 1502. The GUI 1515 also serves to display the results of operation from the OS 1510 and application(s) 1502, whereupon the user may supply additional inputs or terminate the session (e.g., log off).

OS 1510 can execute directly on the bare hardware 1520 (e.g., processor(s) 1404) of device 1400. Alternatively, a hypervisor or virtual machine monitor (VMM) 1530 may be interposed between the bare hardware 1520 and the OS 1510. In this configuration, VMM 1530 acts as a software "cushion" or virtualization layer between the OS 1510 and the bare hardware 1520 of the device 1400.

VMM 1530 instantiates and runs one or more virtual machine instances ("guest machines"). Each guest machine comprises a "guest" operating system, such as OS 1510, and one or more applications, such as application(s) 1502, designed to execute on the guest operating system. The VMM 1530 presents the guest operating systems with a virtual operating platform and manages the execution of the guest operating systems.

In some instances, the VMM 1530 may allow a guest operating system to run as if it is running on the bare hardware 1520 of device 1400 directly. In these instances, the same Revision of the guest operating system configured to execute on the bare hardware 1520 directly may also execute on VMM 1530 without modification or reconfiguration. In other words, VMM 1530 may provide full hardware and CPU virtualization to a guest operating system in some instances.

In other instances, a guest operating system may be specially designed or configured to execute on VMM 1530 for efficiency. In these instances, the guest operating system is "aware" that it executes on a virtual machine monitor. In other words, VMM 1530 may provide para-virtualization to a guest operating system in some instances.

EXTENSIONS AND ALTERNATIVES

In the foregoing specification, the example implementations of the present invention have been described regarding numerous specific details. However, the details may vary from implementation to implementation per the requirements of the implement at hand. The example implementations are, accordingly, to be regarded in an illustrative rather than a restrictive sense.

The invention claimed is:

1. One or more non-transitory storage media storing one or more programs comprising instructions, which, when executed by one or more computing devices, cause the one or more computing devices to perform operations comprising:
   identifying a particular block of discrete cosine transform coefficients;
   determining an above-block of discrete cosine transform coefficients that is above the particular block;
   determining a left-block of discrete cosine transform coefficients that is left of the particular block;
   determining an above-left-block of discrete cosine transform coefficients that is above and left of the particular block;
   decoding entropy coded image data of a further compressed image to obtain a plurality of sub-block AC coefficients for an original compressed image including, for each sub-block AC coefficient of the plurality of sub-block AC coefficients in the particular block, decoding entropy coded image data for the each sub-block AC coefficient based at least in part on:
      a value of a sub-block AC coefficient at a same position, in the above-block, as a position of the each sub-block AC coefficient in the particular block,
      a value of a sub-block AC coefficient at a same position, in the left-block, as a position of the each sub-block AC coefficient in the particular block, and
      a value of a sub-block AC coefficient at a same position, in the above-left-block, as a position of the each sub-block AC coefficient in the particular block; and
   generating a plurality of sample blocks of the original compressed image based at least in part on the plurality of sub-block AC coefficients obtained.

2. The one or more non-transitory storage media of claim 1, the one or more programs further comprising instructions, which, when executed by the one or more computing devices, cause the one or more computing devices to perform operations comprising:
   displaying the original compressed image in a graphical user interface.

3. The one or more non-transitory storage media of claim 1, the one or more programs further comprising instructions, which, when executed by the one or more computing devices, cause the one or more computing devices to perform operations comprising:
   displaying the original compressed image in a web browser window of a graphical user interface.

4. The one or more non-transitory storage media of claim 1, the one or more programs further comprising instructions, wherein, decoding entropy coded image data for the each sub-block AC coefficient comprises:
   decoding entropy coded image data for the each sub-block AC coefficient of the plurality of sub-block AC coefficients based at least in part on an average of:
      the value of the sub-block AC coefficient, at the same position in the above-block, as the position of the each sub-block AC coefficient in the particular block,
      the value of the sub-block AC coefficient, at the same position in the left-block, as the position of the each sub-block AC coefficient in the particular block, and the value of the sub-block AC coefficient, at the same position in the above-left-block, as the position of the each sub-block AC coefficient in the particular block.

5. The one or more non-transitory storage media of claim 1, the one or more programs further comprising instructions, which, when executed by the one or more computing devices, cause the one or more computing devices to perform operations comprising:
decoding entropy coded image data of the further compressed image to obtain a plurality of left-edge AC coefficients for the original compressed image including, for each left-edge AC coefficient of the plurality of left-edge AC coefficients in the particular block, decoding entropy coded image data for the each left-edge AC coefficient based at least in part on:
values of a plurality of AC coefficients, in the left-block, that are in a same row as the each left-edge AC coefficient, and
values of a plurality of AC coefficients, in the particular block, that are in a same row as the each left-edge AC coefficient; and
generating the plurality of sample blocks of the original compressed image based at least in part on the plurality of left-edge AC coefficients obtained.

6. The one or more non-transitory storage media of claim 1, the one or more programs further comprising instructions, which, when executed by the one or more computing devices, cause the one or more computing devices to perform operations comprising:
decoding entropy coded image data of the further compressed image to obtain a plurality of top-edge AC coefficients for the original compressed image including, for each top-edge AC coefficient of the plurality of top-edge AC coefficients in the particular block, decoding entropy coded image data for the each top-edge AC coefficient based at least in part on:
values of a plurality of AC coefficients, in the above-block, that are in a same column as the each top-edge AC coefficient, and
values of a plurality of AC coefficients, in the particular block, that are in a same column as the each top-edge AC coefficient; and
generating the plurality of sample blocks of the original compressed image based at least in part on the plurality of top-edge AC coefficients obtained.

7. The one or more non-transitory storage media of claim 1, further comprising instructions, which, when executed by the one or more computing devices, cause the one or more computing devices to perform operations comprising:
decoding entropy coded image data to obtain a DC coefficient based at least in part on:
a plurality of sample values in a bottom two rows of a sample block above of a target sample block for the DC coefficient,
a plurality of sample values in a rightmost two columns of a sample block coefficients left of the target sample block,
a plurality of sample values in a top two rows of the target sample block, and
a plurality of sample values in a leftmost two columns of the target sample block; and
generating the plurality of sample blocks of the original compressed image based at least in part on the DC coefficient obtained.

8. A method comprising:
identifying a particular block of discrete cosine transform coefficients;
determining an above-block of discrete cosine transform coefficients that is above the particular block;
determining a left-block of discrete cosine transform coefficients that is left of the particular block;
decoding entropy coded image data to of a further compressed image to obtain a plurality of DC coefficients for an original compressed image including, for each DC coefficient of the plurality of DC coefficients in the particular block, decoding entropy coded image data for the each DC coefficient based at least in part on:
a plurality of sample values in a bottom two rows of the above-block,
a plurality of sample values in a rightmost two columns of the left-block,
a plurality of sample values in a top two rows of the particular block, and
a plurality of sample values in a leftmost two columns of the particular block; and
generating a plurality of sample blocks of the original compressed image based at least in part on the plurality of DC coefficients obtained.

9. The method of claim 8, further comprising:
decoding entropy coded image data to obtain the plurality of DC coefficients including, for each DC coefficient of the plurality of DC coefficients, decoding entropy coded image data for the each DC coefficient based at least in part on:
computing a first plurality of image gradients based at least in part on the plurality of sample values in the bottom two rows of the above-block,
computing a second plurality of image gradients, in an opposite direction of the first plurality of image gradients, based at least in part on the plurality of sample values in the top two rows of the particular block for the each DC coefficient,
computing a third plurality of image gradients based at least in part on the plurality of sample values in the rightmost two columns of the left-block, and
computing a fourth plurality of images gradients, in an opposite direction of the third plurality of image gradients, based at least in part on the plurality of sample values in the leftmost two columns of the particular block for the each DC coefficient.

10. The method of claim 8, further comprising:
determining an above-left-block of discrete cosine transform coefficients that is above and left of the particular block;
decoding entropy coded image data of a further compressed image to obtain a plurality of sub-block AC coefficients for an original compressed image including, for each sub-block AC coefficient of the plurality of sub-block AC coefficients in the particular block, decoding entropy coded image data for the each sub-block AC coefficient based at least in part on:
a value of a sub-block AC coefficient at a same position, in the above-block, as a position of the each sub-block AC coefficient in the particular block,
a value of a sub-block AC coefficient at a same position, in the left-block, as a position of the each sub-block AC coefficient in the particular block, and
a value of a sub-block AC coefficient at a same position, in the above-left-block, as a position of the each sub-block AC coefficient in the particular block; and generating a plurality of sample blocks of the original compressed image based at least in part on the plurality of sub-block AC coefficients obtained.

11. The method of claim 8, further comprising:
decoding entropy coded image data of the further compressed image to obtain a plurality of left-edge AC coefficients for the original compressed image including, for each left-edge AC coefficient of the plurality of left-edge AC coefficients in the particular block, decoding entropy coded image data for the each left-edge AC coefficient based at least in part on:
  values of a plurality of AC coefficients, in the left-block, that are in a same row as the each left-edge AC coefficient, and
  values of a plurality of AC coefficients, in the particular block, that are in a same row as the each left-edge AC coefficient; and
generating the plurality of sample blocks of the original compressed image based at least in part on the plurality of left-edge AC coefficients obtained.

12. A computing device comprising:
one or more processors;
storage media; and
one or more programs stored in the storage media and comprising instructions which, when executed by the computing device, cause the computing device to perform operations comprising:
identifying a particular block of discrete cosine transform coefficients;
determining a left-block of discrete cosine transform coefficients that is left of the particular block;
decoding entropy coded image data of a further compressed image to obtain a plurality of left-edge AC coefficients for an original compressed image including, for each left-edge AC coefficient of the plurality of left-edge AC coefficients in the particular block, decoding entropy coded image data for the each left-edge AC coefficient based at least in part on:
  values of a plurality of AC coefficients, in the left-block, that are in a same row as the each left-edge AC coefficient, and
  values of a plurality of AC coefficients, in the particular block, that are in a same row as the each left-edge AC coefficient; and
generating a plurality of sample blocks of the original compressed image based at least in part on the plurality of left-edge AC coefficients obtained.

13. The computing device of claim 12, the one or more programs further comprising instructions which, when executed by the computing device, cause the computing device to perform operations comprising:
determining an above-block of discrete cosine transform coefficients that is above the particular block;
determining an above-left-block of discrete cosine transform coefficients that is above and left of the particular block;
decoding entropy coded image data of the further compressed image to obtain a plurality of sub-block AC coefficients for the original compressed image including, for each sub-block AC coefficient of the plurality of sub-block AC coefficients in the particular block, decoding entropy coded image data for the each sub-block AC coefficient based at least in part on:
  a value of a sub-block AC coefficient at a same position, in the above-block, as a position of the each sub-block AC coefficient in the particular block,
  a value of a sub-block AC coefficient at a same position, in the left-block, as a position of the each sub-block AC coefficient in the particular block, and
  a value of a sub-block AC coefficient at a same position, in the above-left-block, as a position of the each sub-block AC coefficient in the particular block; and
generating a plurality of sample blocks of the original compressed image based at least in part on the plurality of sub-block AC coefficients obtained.

14. The computing device of claim 12, the one or more programs further comprising instructions which, when executed by the computing device, cause the computing device to perform operations comprising:
determining an above-block of discrete cosine transform coefficients that is above the particular block;
decoding entropy coded image data of the further compressed image to obtain a plurality of DC coefficients for an original compressed image including, for each DC coefficient of the plurality of DC coefficients in the particular block, decoding entropy coded image data for the each DC coefficient based at least in part on:
  a plurality of sample values in a bottom two rows of the above-block,
  a plurality of sample values in a rightmost two columns of the left-block,
  a plurality of sample values in a top two rows of the particular block, and
  a plurality of sample values in a leftmost two columns of the particular block; and
generating a plurality of sample blocks of the original compressed image based at least in part on the plurality of DC coefficients obtained.

15. The computing device of claim 12, the one or more programs further comprising instructions which, when executed by the computing device, cause the computing device to perform operations comprising:
determining an above-block of discrete cosine transform coefficients that is above the particular block;
decoding entropy coded image data of the further compressed image to obtain a plurality of top-edge AC coefficients for the original compressed image including, for each top-edge AC coefficient of the plurality of top-edge AC coefficients in the particular block, decoding entropy coded image data for the each top-edge AC coefficient based at least in part on:
  values of a plurality of AC coefficients, in the above-block, that are in a same column as the each top-edge AC coefficient, and
  the values of a plurality of AC coefficients, in the particular block, that are in a same column as the each top-edge AC coefficient; and
generating the plurality of sample blocks of the original compressed image based at least in part on the plurality of top-edge AC coefficients obtained.

16. The computing device of claim 12, wherein:
each AC coefficient, of the plurality of AC coefficients in the left-block, that are in a same row as the each left-edge AC coefficient, is a two-dimensional discrete cosine transform coefficient; and
each AC coefficient, of the plurality of AC coefficients in the particular block, is a is a two-dimensional discrete cosine transform coefficient.

17. The computing device of claim 12, wherein each left-edge AC coefficient, of the plurality of left-edge AC coefficients obtained, is a one-dimensional discrete cosine transform coefficient.

18. The computing device of claim 12, wherein the plurality of left-edge AC coefficients is from a plurality of discrete cosine transform blocks.

19. The computing device of claim 12, wherein the original compressed image is compressed in a format conformant with all requirements of ISO/IEC 10981-1:1994.

20. The computing device of claim 12, the one or more programs further comprising instructions, which, when executed by the computing device, cause the computing device to perform operations comprising:

displaying the original compressed image in a web browser window of a graphical user interface.

\* \* \* \* \*